United States Patent
Bagchi et al.

(10) Patent No.: US 11,907,083 B1
(45) Date of Patent: Feb. 20, 2024

(54) TRANSPARENT SNAPSHOT-BASED FILE SYSTEM CONSISTENT VIRTUAL MACHINE PROTECTION

(71) Applicant: Dell Products L.P., Round Rock, TX (US)

(72) Inventors: Krishnendu Bagchi, Pune (IN); Vipin Kaushal, Bangalore (IN); Sudha Hebsur, Bangalore (IN); Amarendra Behera, Bangalore (IN); Pallavi Prakash, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/966,528

(22) Filed: Oct. 14, 2022

(51) Int. Cl.
| | | |
|---|---|---|
| *G06F 16/10* | (2019.01) | |
| *G06F 11/14* | (2006.01) | |
| *G06F 16/188* | (2019.01) | |
| *G06F 16/11* | (2019.01) | |

(52) U.S. Cl.
CPC ........ *G06F 11/1469* (2013.01); *G06F 16/128* (2019.01); *G06F 16/188* (2019.01); *G06F 2201/84* (2013.01)

(58) Field of Classification Search
CPC .. G06F 11/1469; G06F 16/128; G06F 16/188; G06F 2201/84
See application file for complete search history.

(56) References Cited

U.S. PATENT DOCUMENTS

| | | | |
|---|---|---|---|
| 8,850,146 B1 | 9/2014 | Majumdar | |
| 10,489,518 B1* | 11/2019 | Ramachandran | ... G06F 9/45558 |
| 11,397,650 B1* | 7/2022 | Palaiah | ............... G06F 11/1448 |
| 2009/0037680 A1* | 2/2009 | Colbert | ................. G06F 3/0683 |
| | | | 711/E12.103 |
| 2015/0081993 A1 | 3/2015 | Christopher | |
| 2015/0212893 A1 | 7/2015 | Pawar | |
| 2020/0019466 A1* | 1/2020 | Patwardhan | ........ G06F 9/45558 |
| 2020/0065196 A1* | 2/2020 | Desai | .................. G06F 11/1484 |

OTHER PUBLICATIONS

Article entitled "PowerProtect Data Manager 19.9 Administration and User Guide", by Dell, dated Jan. 2022 (Year: 2022).*
Article entitled "Shrink VMDK Virtual Disk Size on VMWare ESXi—How to do it", by Matthew, dated Apr. 22, 2021 (Year: 2021).*

* cited by examiner

*Primary Examiner* — Mahesh H Dwivedi
(74) *Attorney, Agent, or Firm* — Staniford Tomita LLP

(57) ABSTRACT

A command is received by a data protection agent to conduct a file system-consistent backup of a virtual machine (VM) having a copy service. A first request is issued to the copy service indicating that all files of the VM are to be backed up and that archive attributes of all the files should remain unchanged. A second request is issued to a snapshot data mover for a snapshot of the VM. The snapshot request is passed to a virtual machine manager. Upon the snapshot data mover receiving an identifier identifying the snapshot from the virtual machine manager, the snapshot identifier is passed to the data protection agent, thereby allowing the agent to locate the snapshot and conduct the backup.

18 Claims, 16 Drawing Sheets

```
┌─────────────────────────────────────────────────────────────────────────────┐
│ Receive, at a data protection agent, a command to conduct a file system-consistent backup of │
│ a virtual machine, the virtual machine including an application and a copy service having   │
│ application and system writers, the application writer being responsible for quiescing the  │
│ application and the system writers being responsible for quiescing system state of the virtual │
│                                    machine                                  │
│                                       810                                   │
└─────────────────────────────────────────────────────────────────────────────┘
                                        │
                                        ▼
┌─────────────────────────────────────────────────────────────────────────────┐
│ Issue, from the data protection agent, a first request to a copy service indicating that all files of │
│ the virtual machine are to be backed up and that archive attributes of all the files should remain │
│ unchanged, the first request thereby triggering the copy service to notify the application and │
│                    system writers of a snapshot operation                    │
│                                       815                                   │
└─────────────────────────────────────────────────────────────────────────────┘
                                        │
                                        ▼
┌─────────────────────────────────────────────────────────────────────────────┐
│ Issue, from the data protection agent, a second request to a snapshot data mover for a │
│ snapshot of the virtual machine, the snapshot data mover executing on the host and outside of │
│                              the virtual machine                             │
│                                       820                                   │
└─────────────────────────────────────────────────────────────────────────────┘
                                        │
                                        ▼
┌─────────────────────────────────────────────────────────────────────────────┐
│ Pass the request for the snapshot from the snapshot data mover to a virtual machine manager │
│                                       825                                   │
└─────────────────────────────────────────────────────────────────────────────┘
                                        │
                                        ▼
┌─────────────────────────────────────────────────────────────────────────────┐
│ Receive, at the snapshot data mover from the virtual machine manager, an identifier identifying │
│                                   the snapshot                              │
│                                       830                                   │
└─────────────────────────────────────────────────────────────────────────────┘
                                        │
                                        ▼
┌─────────────────────────────────────────────────────────────────────────────┐
│ Pass the snapshot identifier to the data protection agent thereby allowing the data protection │
│               agent to locate the snapshot and conduct the backup            │
│                                       835                                   │
└─────────────────────────────────────────────────────────────────────────────┘
```

FIG. 8

```
┌─────────────────────────────────────────────────────────────────────┐
│ Receive, at a data protection agent, a command to conduct a backup  │
│ of a virtual machine, the virtual machine including a copy service  │
│ having a writer responsible for quiescing an application running    │
│ in the virtual machine                                              │
│                              910                                    │
└─────────────────────────────────────────────────────────────────────┘
                                    │
                                    ▼
┌─────────────────────────────────────────────────────────────────────┐
│         Initiating a discovery of disk types attached to the        │
│                          virtual machine                            │
│                              915                                    │
└─────────────────────────────────────────────────────────────────────┘
                                    │
                                    ▼
┌─────────────────────────────────────────────────────────────────────┐
│ Based on the discovery, identifying a first disk attached to the    │
│ virtual machine as being a virtual machine disk (VMDK) formatted    │
│ disk, and a second disk attached to the virtual machine as being    │
│ a raw device mapping (RDM) formatted disk                           │
│                              920                                    │
└─────────────────────────────────────────────────────────────────────┘
                                    │
                                    ▼
┌─────────────────────────────────────────────────────────────────────┐
│ After the discovery and identification, request, via the copy       │
│ service, that the writer prepare the application for a snapshot     │
│ operation, the request thereby triggering a time window within      │
│ which the application will be frozen                                │
│                              925                                    │
└─────────────────────────────────────────────────────────────────────┘
                                    │
                                    ▼
┌─────────────────────────────────────────────────────────────────────┐
│ Issue, over a socket communication channel, a first request for a   │
│ snapshot of the VMDK formatted disk to a snapshot data mover        │
│ running on the host and outside of the virtual machine              │
│                              930                                    │
└─────────────────────────────────────────────────────────────────────┘
                                    │
                                    ▼
┌─────────────────────────────────────────────────────────────────────┐
│ Issue, in conjunction with the first request and over a             │
│ transmission control protocol (TCP) network, a second request for   │
│ a snapshot of the RDM formatted disk to a controller of a storage   │
│ array responsible for presenting the second disk to the virtual     │
│ machine                                                             │
│                              935                                    │
└─────────────────────────────────────────────────────────────────────┘
                                    │
                                    ▼
┌─────────────────────────────────────────────────────────────────────┐
│      Manage responses to the first and second snapshot requests     │
│                       to conduct the backup                         │
│                              940                                    │
└─────────────────────────────────────────────────────────────────────┘
```

FIG. 9

Install, within the virtual machine, a data protection agent to interact with a copy service of the virtual machine, the copy service including a writer that is responsible for freezing the application
1210

Receive a request to perform the backup, the request including identifications of virtual machine disks (VMDKs) associated with the virtual machine
1215

Communicate with a disk manager of a guest operating system of the virtual machine to generate a map that maps the VMDKs to volumes that are attached to the virtual machine
1220

Communicate with the application to identify which of the volumes contain application databases associated with the application
1225

Notify the copy service to prepare the application for the backup
1230

Issue a request to a snapshot data mover for a snapshot of the application, where the request includes identifications of a subset of the VMDKs mapped to corresponding volumes that contain the application databases, and where VMDKs mapped to corresponding volumes not containing the application databases are excluded from the request
1235

FIG. 12

```
{
    "vCenterDetails": {
        "host": "vcenter.host.com",
        "port": 443,
        "token": {
            "type": "SOAP_SESSION",
            "value": "f15a244514045 2dc0f4be0 69eacdf4e32b8038e5"
        }
    },
    "spec": {
        "vendorId": "Dell EMC PowerProtect",
        "vmProtectedEntity": {
            "vmRef": "vm-89",
            "includedDiskKeys": [
                "6000c2995fc3c4928d6650596bb02cef",
                "6000c2939b157427dadbace321ed4973",
                "6000c2950ee96195490938642bb03b4"  ⟵ 1510
            ]
        },
        "snapshotType": "crashConsistent",
        "baseSnapshotUuid": ""
    },
```

FIG. 15

TRANSPARENT SNAPSHOT-BASED FILE SYSTEM CONSISTENT VIRTUAL MACHINE PROTECTION

CROSS-REFERENCE TO RELATED APPLICATIONS

The present application is related to U.S. patent application Ser. No. 17/966,464, filed Oct. 14, 2022; Ser. No. 17/966,503, filed Oct. 14, 2022; Ser. No. 17/966,484, filed Oct. 14, 2022; 17/966,558, filed Oct. 14, 2022; Ser. No. 17/966,588, filed Oct. 14, 2022; and Ser. No. 17/966,603, filed Oct. 14, 2022, all assigned to the assignee of the present application, and each incorporated herein by reference in its entirety.

TECHNICAL FIELD

Embodiments are generally directed to information processing, and more specifically to conducting backups in a virtual machine environment.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Virtualization is a technique where software is used to create an abstraction layer over the physical hardware. A virtualized computer is referred to as a virtual machine (VM). Virtualization allows an enterprise to run multiple virtual computers (or virtual machines) on a single physical server. A virtual machine, like a physical computer, can have its own running application and operating system. A layer of software referred to as a hypervisor is installed on a physical server which then hosts the virtual machine. The hypervisor runs the virtual machine by presenting the guest application and operating system in the virtual machine with a logical or virtualized view of the hardware resources that are available. Virtualization can allow for efficient use of an organization's physical resources through flexible resource sharing. Virtualization can also be used to promote security through isolation. A virtual machine can be isolated, via the hypervisor, from directly connecting with another virtual machine or other infrastructure component or network of the data center within which the host server resides. A virtual machine may be managed by a virtual machine management center. Examples of a hypervisor and virtual machine management center include ESXi and vCenter, respectively, as provided by VMware of Palo Alto, California.

There remains a need to conduct regular backups. Organizations depend on having ready access to their data. Data, however, can be lost in a variety of ways such as through disasters and catastrophes (e.g., fires or flooding), media failures (e.g., disk crash), computer viruses, accidental deletion, and so forth. An organization may have an immense amount of data that is critical to the organization's operation.

Conducting backups can be disruptive. Processing cycles that would otherwise be devoted to handling production requests must be diverted to handling the backup operation. Snapshots can help minimize application disruption. A snapshot is a set of pointers for data at a particular point in time. Once a snapshot has been generated, the actual copying or movement of data to secondary storage can proceed using the snapshot.

An application-consistent backup is a type of backup where the application to be backed up is notified about the backup. This provides the application with an opportunity to flush content in memory to disk. Conducting application-consistent backups is especially important for database applications such as Microsoft SQL Server and Exchange as provided by Microsoft Corporation because the applications typically do not write directly to disk. Instead, writes are made to logs cached in memory and then later committed to the database or disk. This technique or use of logs helps to improve disk access speed.

A copy service can be used to prepare an application for backup. An example of a copy service is volume shadow copy service (VSS) as provided by Microsoft. VSS is a backup framework that runs on the Microsoft Windows operating system and can be used to facilitate application-consistent backups of Microsoft applications including SQL Server and Exchange. When the VSS copy service is asked to prepare for a snapshot (which may be referred to as a shadow copy), the copy service assists with temporarily quiescing or freezing the application and flushing memory contents to disk so that all application data is captured in the snapshot.

The VSS copy service provides limited windows of time for which it expects the snapshot generation to be completed. If the snapshot cannot be generated within the prescribed time windows, then the copy service considers the snapshot generation and thus backup as having failed and marks the failure accordingly.

Running applications in a virtualized environment involves a certain amount of virtualization overhead as virtualization introduces a layer of abstraction requiring a series of redirections when reading and writing data. A virtualization platform may include tools and services to assist with snapshot generation and backup. It has been observed, however, that there are situations and configurations where application-consistent snapshots are not supported, the copy service times out before snapshot generation can be completed, a backup is marked as successful when in fact it has failed thereby leading to potential data loss or corruption, snapshots are not taken of certain disk types that may be attached to the virtual machine, over-inclusion of disks that may be included in a snapshot, and other problems.

Thus, there is a need for improved systems and techniques for application-awareness protection in a virtualized environment.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. PowerProtect Data Manager, EMC, Data Domain, Data Domain Restorer, and Data Domain Boost are trademarks of Dell Technologies.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 8 shows a flow for snapshot-based file system-consistent virtual machine protection, according to one or more embodiments.

FIG. 9 shows a flow of a snapshot process for virtual machines having heterogeneous disks, according to one or more embodiments.

FIG. 12 shows a flow for excluding disks during an application-consistent backup of a virtual machine, according to one or more embodiments.

FIG. 15 shows an example of a snapshot request that may be sent from the in-guest data protection agent to host-level snapshot data mover, according to one or more embodiments.

DETAILED DESCRIPTION

Figure 1:
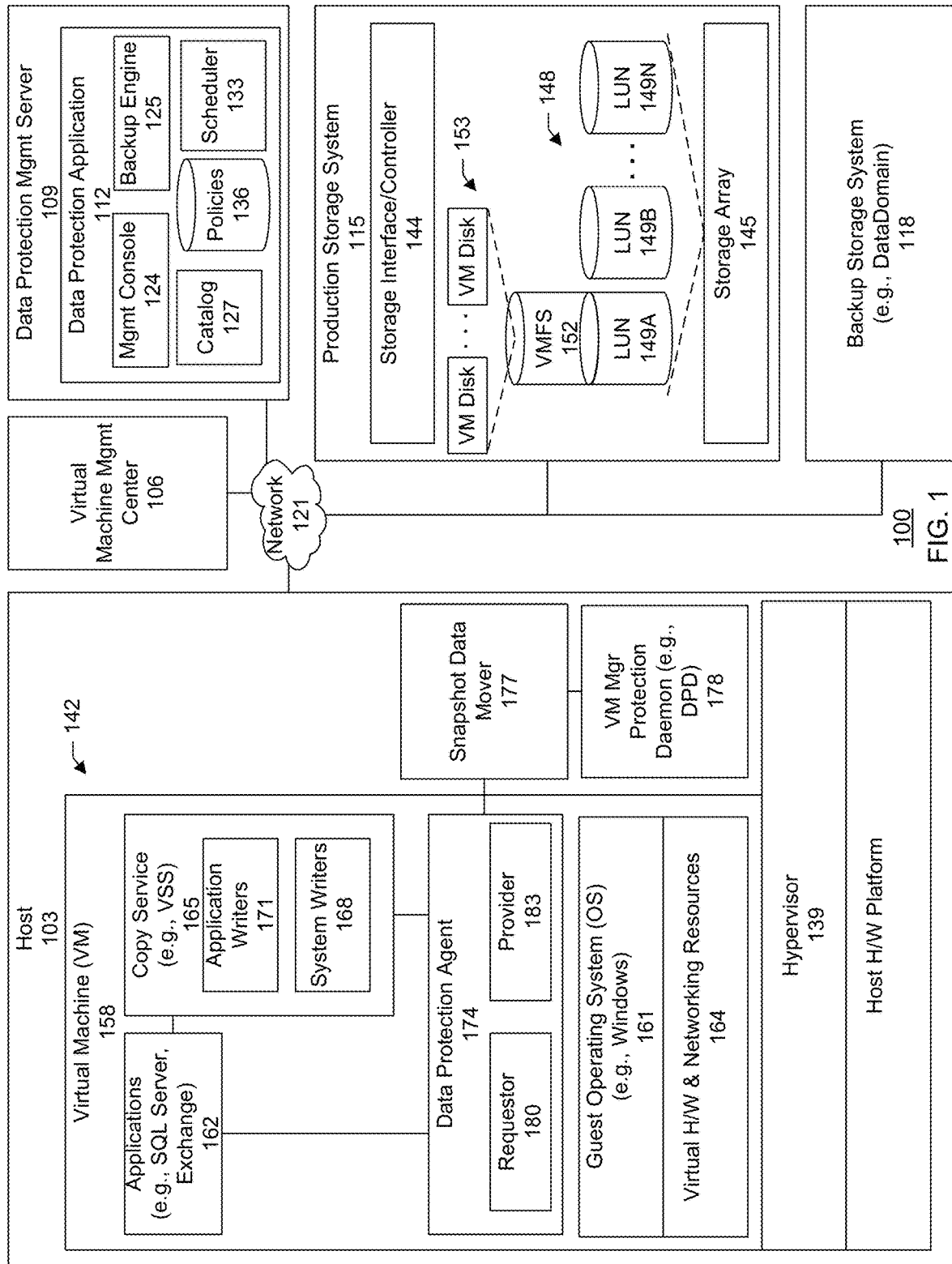
FIG. 1 shows a block diagram of a data protection backup system, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a non-transitory computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. It should be appreciated that the blocks shown in the figures can be functional entities and there can be many different hardware and software configurations to implement the functions described. One or more individual blocks may exist as separate code modules. Alternatively, two or more blocks may be combined into a single code module. The various modules of the system may be implemented at any level such as at the application level, operating system level, and so forth. In this disclosure, the variable N and other similar index variables are assumed to be arbitrary positive integers greater than or equal to two.

Disclosed herein are methods and systems for application awareness protection and, more particularly, conducting data protection operations (e.g., backups) of a virtual machine or application running in the virtual machine. Such operations may be referred to as an AppConsistent or AppAware workflow. Enterprises rely on backup and recovery software products to backup and recover data. It is important that backups be conducted on a regular basis so as to help ensure minimal disruption if the enterprise suffers an event that causes data loss. Generally, a backup involves copying and archiving the data, e.g., creating and saving to secondary or backup storage media, so that the data is available for restore should the primary copy of the data at the production site become lost or corrupted. The backups stored at secondary storage may be stored in a format different from their native format. For example, the backups may be stored in a deduplicated format, compressed format, encrypted format, or combinations of these. An example of a backup target to which data may be backed up is Data Domain (DD) as provided by Dell Technologies of Round Rock, Texas.

Some embodiments involve automated backup recovery techniques in a distributed system, such as a very large-scale wide area network (WAN), metropolitan area network (MAN), or cloud based network system. Those skilled in the art, however, will appreciate that embodiments are not limited thereto, and may include smaller-scale networks, such as local area networks (LANs). Thus, aspects of the one or more embodiments described herein may be implemented on one or more computers executing software instructions, and the computers may be networked in a client-server arrangement or similar distributed computer network.

FIG. 1 illustrates a computer network or information processing system 100 that implements one or more embodiments of an architecture for a data protection backup system. The system shown in FIG. 1 includes one or more hosts 103, a virtual machine management center 106, a data protection backup management server 109 having a data protection application 112, a primary or production storage system 115, and a secondary or backup storage system 118.

The hosts may be arranged into a cluster or other grouping of two or more interconnected computers running in parallel to support, for example, a distributed application, database, or file system. An example of a data protection backup system includes PowerProtect Data Manager (PPDM) as provided by Dell Technologies. PowerProtect Data Manager is a data protection application providing backup, restore, automated discovery, deduplication, and IT governance for physical, virtual, and cloud environments. While some specific embodiments are described in conjunction with PPDM and Data Domain, it should be appreciated that the described systems and techniques can be applied to other data protection backup systems.

A network 121 connects the various system or sub-system components shown in FIG. 1 and allows clients to access the services and applications hosted by the hosts. The hosts may be general purpose computers or servers with hardware and software. The hosts may include, for example, a processor, memory, network interface card, local storage, applications, file system, operating system, and the like. The hosts and backup management server execute executable code (or computer-readable code) that embodies a technique or algorithm as described herein. The network may include an interconnect that connects the hosts and backup management server to the primary and secondary storage systems. The interconnect may include a bus, a connection over a network such as a storage area network (SAN), local area network (LAN), or any other connection scheme to communicatively connect to the storage systems.

The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data protection management server is responsible for the overall management and configuration of data protection backup operations. In an embodiment, the data protection application includes a management console 124, backup engine 125, backup catalog 127, backup scheduler 133, and data protection policies 136. The management console provides a user interface to the data protection backup system that allows a user, such as a backup administrator, to schedule backups, define data protection backup policies, identify and add assets to be protected to the policies, identify data sources to be backed up, set retention durations, trigger on-demand backups, initiate recoveries, select recovery options, view status updates on backup and recovery operations, select a backup copy to restore, and configure other backup and recovery options and perform other administrative tasks.

The backup catalog provides an index of backups that can be browsed. The catalog contains metadata for each backup such as a time and date of a backup, location of a backup, files included in a backup, and the like. The backup scheduler is responsible for determining when a backup should be conducted. The backup engine manages the rollover of copying of data from the production or primary storage system to the backup or secondary storage system.

A data protection backup policy allows a user to configure backup settings and options for multiple, e.g., two or more, virtual machines such as a cluster or group of virtual machines globally rather than having to repeatedly configure the same backup settings for each virtual machine of a cluster individually. Each virtual machine that is added or associated to a particular backup policy is then backed up according to the configurations set in the particular backup policy.

A data protection backup policy may specify a backup schedule at which backups of the virtual machines or applications running within the virtual machine are to be performed (e.g., backup hourly, daily at a particular time, or at any other periodic interval as desired), VSS backup type (e.g., VSS full backup or VSS copy backup), retention duration, target destination location, credentials required for accessing an in-guest VM agent, and many other options or features that may be available to the user to configure. For example, a backup application may include options such as crash-consistent, file system-consistent, application-consistent, options to optimize for storage consumption, options to optimize for speed, options to exclude memory and swap files, and so forth. The configuration options set in the backup policy are then applied to each virtual machine associated with the backup policy.

In an embodiment, installed on the host is a bare metal hypervisor 139 running one or more virtual machines 142. The virtual machines access and store data to the primary storage system. The primary storage may include a storage interface 144 and any number of storage arrays 145. The storage interface allow for communications with a controller of the storage array. The controller is responsible for managing the physical disk drives and presenting them as logical units. A storage array is a data storage system that may be used for block-based, file-based, or object storage. A storage array may include any number of hard disk drives, solid-state drives, or both (e.g., hybrid array). A storage array may be referred to as a disk array or flash array. Logical unit numbers (LUNs) 148 provide logical abstractions for a physical storage array. A LUN may refer to an entire physical disk, array, group of disks, portions of disks, portion of a disk, or portion of an array. In an embodiment, a LUN identifies a storage device. The storage interface can include an application programming interface (API) through which the LUNs and other functions of the storage system can be accessed.

In an embodiment, a LUN 149A includes a volume formatted with a virtual machine file system (VMFS) 152 that contains a set of virtual machine disks (VMDKs) 153 for the virtual machines. A virtual machine may be connected or attached to one or more virtual machine disks to which the virtual machine or, more particularly, operating system of the virtual machine writes and reads data.

A LUN, such as a LUN 149B, may instead or additionally be mounted to a virtual machine directly, thereby bypassing the virtual machine file system, in a storage configuration referred to as raw device mapping (RDM). In an RDM storage configuration, a pointer or mapping file residing in the virtual machine file system contains details identifying the LUN and acts as a proxy to locate the LUN. Bypassing the virtual machine file system layer allows the guest operating system in the virtual machine to issue Small Computer System Interface (SCSI) commands directly to the LUN. An RDM storage configuration can offer performance benefits depending on the type of application running in the virtual machine.

The virtual machine management center handles management, configuration, and other administrative tasks for the virtual machines. An example of a virtual machine management center is vCenter as provided by VMware of Palo Alto, California. The virtual machine management center provides a central location to access information about the resource use of each virtual machine, provision resources such as scaling and adjusting the compute, memory, storage and other resources for the virtual machines, and other management and administrative functions. The virtual machine management center and virtual machine host computers can be queried to gather configuration details of the virtual machines, coordinate backups of the virtual machines including snapshot generation, obtain virtual machine status, and so forth.

Virtual machines have emerged as one of the fundamental technologies that companies use in their data centers and elsewhere to manage and process data and provide services. A virtualization software layer, such as the hypervisor, on the host hardware platform allows for the creation and hosting of virtual machines. A host hardware platform may host dozens, hundreds, or even thousands of virtual machines. A virtual machine, such as a virtual machine 158, may include as guests an operating system 161 (e.g., Windows) and one or more application programs 162.

A virtual machine is a software abstraction of a real computer system. The virtualization layer (e.g., hypervisor) is responsible for presenting the guest OS and applications with a logical view of physical resources. For example, the hypervisor may provide for a virtualized hardware interface to the above guest operating system and applications. The virtualized hardware interface may include a set of virtual processing and networking resources 164 including, for example, virtualized central processing units (CPUs), memory, disks, network interfaces, sockets, ports, and so forth. Virtualization allows for, among other things, security through isolation. For example, a virtual machine may be assigned to a network that is separate or different from a network used to connect the different infrastructure components of a data center. This helps to limit the impact that a compromised virtual machine will have on other applications running in other virtual machines and other infrastructure components.

Examples of applications that may be deployed as guests in virtual machines include Exchange and SQL Server as provided by Microsoft Corporation of Redmond, Washington. Exchange and SQL Server are an email server and relational database management system (RDBMS), respectively, that run on Microsoft Windows Server operating systems. Examples of virtualization software include ESXi and vCenter as provided by VMware of Palo Alto, California. ESXi is a bare metal (type 1) hypervisor for deploying virtual machines. Bare metal hypervisors include their own operating system components including kernel and are designed to be installed on a "bare metal" host (i.e., without an operating system). vCenter or vCenter Server is a centralized management utility that may be used to manage and administer the virtual machines, hosts, and other dependent components from a centralized location.

It should be appreciated that while some embodiments are shown and described in conjunction with the vSphere virtualization platform (e.g., ESXi and vCenter) as provided by VMWare, volume shadow copy service (VSS) as provided by Microsoft, and PowerProtect Data Manager (PPDM) and Data Domain as provided by Dell Technologies, aspects and principles of the systems and techniques described can be applicable to other virtualization platforms, point-in-time copy services, and backup storage systems.

As discussed, application data can be lost in a variety of ways such as through accidental deletion, hardware and media failures, disasters and catastrophes (e.g., fires or flooding), computer viruses, malicious attacks, and so forth. Thus, it is important to conduct regular backups. Backups can be conducted at different levels of consistency. For example, a crash-consistent backup involves creating a backup copy at the level of the storage layer without involving the application layer. Thus, there will be very little impact to application processing. Crash-consistent backups are named as such because they are analogous to capturing the state of the production or primary disk at the time of a hardware crash or loss of power. However, only data that has already been written to disk is backed up. Data yet to be committed such as data in memory, cache, or pending IO operations may not be included in the backup. This loss of data yet to be committed to disk can be especially problematic when database applications, such as Exchange or SQL Server, are involved. A memory cache may hold a large amount of data due to the technique with which certain applications, such as database applications, operate. The failure to capture such data in a backup may even render the entire backup copy of the application unrestorable.

Thus, in some cases, it is desirable to create application-consistent or even entire file system-consistent backups. Application-consistent backups can be made after making sure that application operations have been paused and any data in memory has been flushed to disk. It is desirable, however, to limit application interruptions. Techniques such as snapshotting can be used to limit application interruptions. A snapshot may be created at the level of a volume and represents an instantaneous read-only point-in-time copy of the volume. Snapshots can be created very quickly because they are logical rather than actual copies of data. In particular, a snapshot may include a set of reference markers or pointers to the actual data. In a snapshot backup, a region on storage may be set aside for a snapshot. Snapshots are attractive options for backups because they are designed to be created very quickly while the application is still running (or with little disruption to the application) as snapshots are virtual copies of the data and not the actual copy. For example, it can be much faster to designate an area on disk for a snapshot and use pointers to data as compared to copying the entire actual source data.

There are many ways to generate a snapshot including copy-on-write (COW), redirect-on-write, clone or split mirror, and others. Once the snapshot has been generated, the rollover or synchronization (sync) phase of the backup during which data is copied to secondary storage can proceed using the snapshot while normal application operations resume.

Some operating systems provide a copy service that a data protection application can use to facilitate backups. In an embodiment, the data protection application leverages a copy service framework 165 to facilitate snapshot backups. In an embodiment, the copy service is referred to as volume shadow copy service (VSS) as provided by Microsoft. VSS is an operating system (e.g., Microsoft Windows) resident service that allows for generating a snapshot of computer files or volumes even when they are in use. A snapshot may be referred to as a shadow copy. VSS can be used in conjunction with a file system (e.g., New Technology File System (NTFS)) that is able to create and store shadow copies or snapshots of files or volumes.

The components involved in VSS snapshot backups include providers, requesters, and writers. Providers manage running volumes and create the shadow copies of them on demand. A provider is responsible for intercepting I/O requests between the file system and the underlying mass storage system; capturing and retrieving the status of a volume at the time of snapshot (e.g., shadow copy); maintaining a "point in time" view of the files on the disk with no partial I/O operations reflected in its state; and using this "point in time" view to expose a virtual volume containing the snapshotted or shadow copied data.

A requester refers to an application (e.g., backup application) that uses the VSS copy service application programming interface (API) to request the services of the volume shadow copy service to initiate generating a snapshot. The requester may also communicate with writers to gather information on the system and to signal writers to prepare their data for backup.

Writers store persistent information in files on disk and provide the names and locations of these files to requesters by using the shadow copy service interface. During backup operations, writers ensure that the files or other data that they are responsible for is quiescent and stable—suitable for shadow copy snapshotting and backup. Specifically, VSS uses a collection of VSS writers to help bring the application or virtual machine into a consistent state prior to the creation of a snapshot. The writers help to ensure logically-consistent open file backups.

Writers can include system writers 168 and application writers 171. There may be a writer for each application to be backed up. For example, there may be an Exchange Writer, SQL Server Writer, Registry Writer, and so forth. Each writer is aware of where its corresponding application or program stores its data. A writer may be responsible for functions such as quiescing the corresponding application and data stores to be backed up (e.g., temporarily freezing application I/O write requests) and flushing the cache for snapshot generation, and thawing the application and data stores after the snapshot is generated. A writer may further create or facilitate the creation of a description of the backup components, a data restoration process, or both. The information can be used by the backup application to determine how to backup and restore or recover the data. System writers are responsible for handling system state including, for example, operating system files, registry, and related extensions. The system writers help to ensure that system files are saved to disk before generation of the snapshot.

The copy service framework facilitates coordination among the different components to prepare an application or file system for snapshot, gather and identify the files and other information required to be included in the snapshot, generate the metadata required to properly restore the application, freeze the application, thaw the application, receive status concerning the snapshot operation, and notify other dependent services of status throughout the snapshot operation.

Current snapshot backup systems have not been able to accommodate the overhead of virtualization especially in regards to generating application-consistent backups of virtual machines. There are difficulties with coordination among the different components involved in generating a snapshot as multiple software products from different developers can be involved. This can lead to a lack of control and overall visibility with snapshot generation that then results in failed backups and, even worse, marking a snapshot backup as successful when in fact a failure has occurred.

For example, virtual machines are isolated by design. Thus it can be difficult to gain visibility into the applications and other processes running in the virtual machine, volumes and disk types attached to the virtual machine that are required or not required to be in a backup, volumes and disks to which the applications store data that should be backed up, and other configuration details. A copy service framework, such as VSS, imposes strict time windows concerning the amount of time a process spends in a particular method. Various method calls and returns can trigger other events and these time windows within which a task must be completed before a timeout occurs.

Virtualization platforms have attempted to facilitate snapshot generation of the virtual machines, yet shortcomings remain. For example, VMware provides a set of utilities referred to as VMware Tools and an application programming interface (API) referred to as VMware API for Data Protection (VADP) that can be used to prepare a virtual machine for a snapshot backup. Previous data protection backup systems relied on VMware Tools as a VSS requestor. This reliance resulted in very little control over coordination with the VSS copy service, preparation activities prior to snapshot generation, and activities post snapshot generation.

For example, VMware Tools serving as a VSS requestor indicates a backup as complete to the VSS copy service once a snapshot has been generated, but before data has actually been rolled over from the snapshot to secondary storage. This can lead to problems in cases where the rollover failed to properly complete as there will be references to a backup that does not actually exist. As another example, the time required to generate a snapshot sometimes exceeded the time windows prescribed by the VSS copy service. As another example, there was a lack of support for certain disk types that may be attached to a virtual machine. As another example, there was an inability to exclude certain disk types or volumes from a snapshot.

The VADP snapshot process pauses the execution of the virtual machine and allows in-flight disk I/Os to complete. This action may increase the read and write latency and affect the snapshot and virtual machine ecosystem life cycle. When analyzing the life cycle of a VADP snapshot, the snapshot entry and exit points inflict a penalty on a virtual machine. After producing a snapshot of a virtual machine disk file, requiring the virtual machine to be stunned, a snapshot of the virtual machine disk file is ingested. Then, the deltas must be consolidated into the base disk. When a snapshot of a high-transactional application, like a database, is to be created there can be adverse effects. These effects include lengthy backup windows and application timeouts.

In other words, during the VADP snapshot and rollover process changes are directed to a new disk. This new disk must eventually be merged into the base disk once the rollover is complete. An application, such as SQL Server, may have many thousands of transactions per second. In such a case, the new disk to which the transactions are directed can become very large. Merging such a large disk into the base disk during consolidation can cause timeouts and other performance problems concerning the virtual machine. In some cases, the consolidation can require up to an hour or more.

VMWare ESXi version 7.0.3 has built in support for a new technique referred to as Light Weight Delta Filter (LWD) based snapshots. These snapshots may be referred to as transparent snapshots. This is a new snapshot technology framework exposed by VMWare to avoid stunning of the guest OS in the virtual machine while creating or consolidating a snapshot. In particular, filters referred to as light weight delta filters may be attached to each virtual machine (e.g., virtual machine disk) that is to be protected. The LWDs are filter drivers that track changes occurring to the virtual machine or virtual machine disk (e.g., VMDK). LWD filter drivers may reside at the host (e.g., ESXi host) and track changes (e.g., writes) using a bitmap. In particular, during a rollover operation, writes are made directly to the production disk. The writes or changes during the rollover are tracked via a bitmap. The bitmap can then be merged with a previous bitmap representing the production disk before the rollover or snapshot. Merging two bitmaps can be a much faster operation than merging two virtual machine disks.

LWD, however, does not support file system and application quiescing on Microsoft Windows virtual machines. Thus, even if a customer enterprise has upgraded their virtualization software to ESXi version 7.0.03 in order to take advantage of LWD transparent snapshots and move from VADP snapshots, issues will still remain regarding application awareness protection.

In an embodiment, problems with providing application awareness protection in a virtualized environment are addressed with a data protection backup system having a data protection agent 174 installed as a guest within or inside the virtual machine and a snapshot data mover (SDM) 177 installed outside or external to the virtual machine at a host-level on the host hosting the virtual machine. The snapshot data mover may be referred to as a transparent snapshot data mover (TSDM) and communicates with a virtual machine protection daemon 178 also running at the host-level.

The in-guest data protection agent is able to interact with the copy service and guest application and guest operating system. The data protection agent can gain visibility into the guest application because the data protection agent is installed as a guest in the virtual machine alongside the application. A snapshot backup operation is triggered when the in-guest agent receives a command from the data protection management server. The data protection management server is responsible for initiating a backup operation by sending a backup command to the data protection agent and managing the data rollover operation to secondary storage.

The data protection agent includes a requestor 180 and a provider 183. The requestor and provider may be referred to as an agent VSS requestor and agent VSS provider, respectively. These and other components of the data protection agent may be bundled into a single installation package for the virtual machine. The requestor and provider components of the data protection agent function as the required communication endpoints for the copy service. The data protection agent communicates with the (transparent) snapshot data mover to coordinate snapshot generation. The data protection agent, by virtue of being inside the virtual machine, can gather application details, determine application status, and interface and communicate with the copy service, guest application, and guest operating system.

Likewise, the transparent snapshot data mover, by virtue of being at the host-level and outside the virtual machine, can communicate with the infrastructure layer of the virtualization platform including the virtual machine manager and storage systems. The tight coordination between the in-guest data protection agent and transparent snapshot data mover allows for a careful orchestration (especially the timing of tasks and requests) among the components involved with snapshot generation for application-consistent snapshots including, for example, the copy service, virtual machine manager, virtual machine management and data protection daemons running at the host level, primary storage system, secondary storage system, and other components.

The snapshot data mover may be privy to information not accessible by the in-guest agent. Conversely, the in-guest agent may be privy to information not accessible by the snapshot data mover. The in-guest agent and snapshot data mover can coordinate with each other to, for example, conduct discovery operations to identify the databases or files needing protection (e.g., databases storing application data), locations of the databases and files, virtual hardware device properties; identify relevant volumes, virtual machine disks, LUNs, disk types, and configuration; determine and identify volumes or disks to exclude; probe, interface, and communicate with the application or file system to be protected, operating system, services that may be running within the virtual machine (e.g., copy service), services that may be running at the host level (e.g., virtual machine protection daemon), disk utility and management services, storage system, and virtual machine management center; coordinate and manage the timing of snapshot requests; manage responses to the snapshot requests; track the progress of different snapshot requests; and track the progress of subsequent rollover operations to name a few examples.

Figure 2:
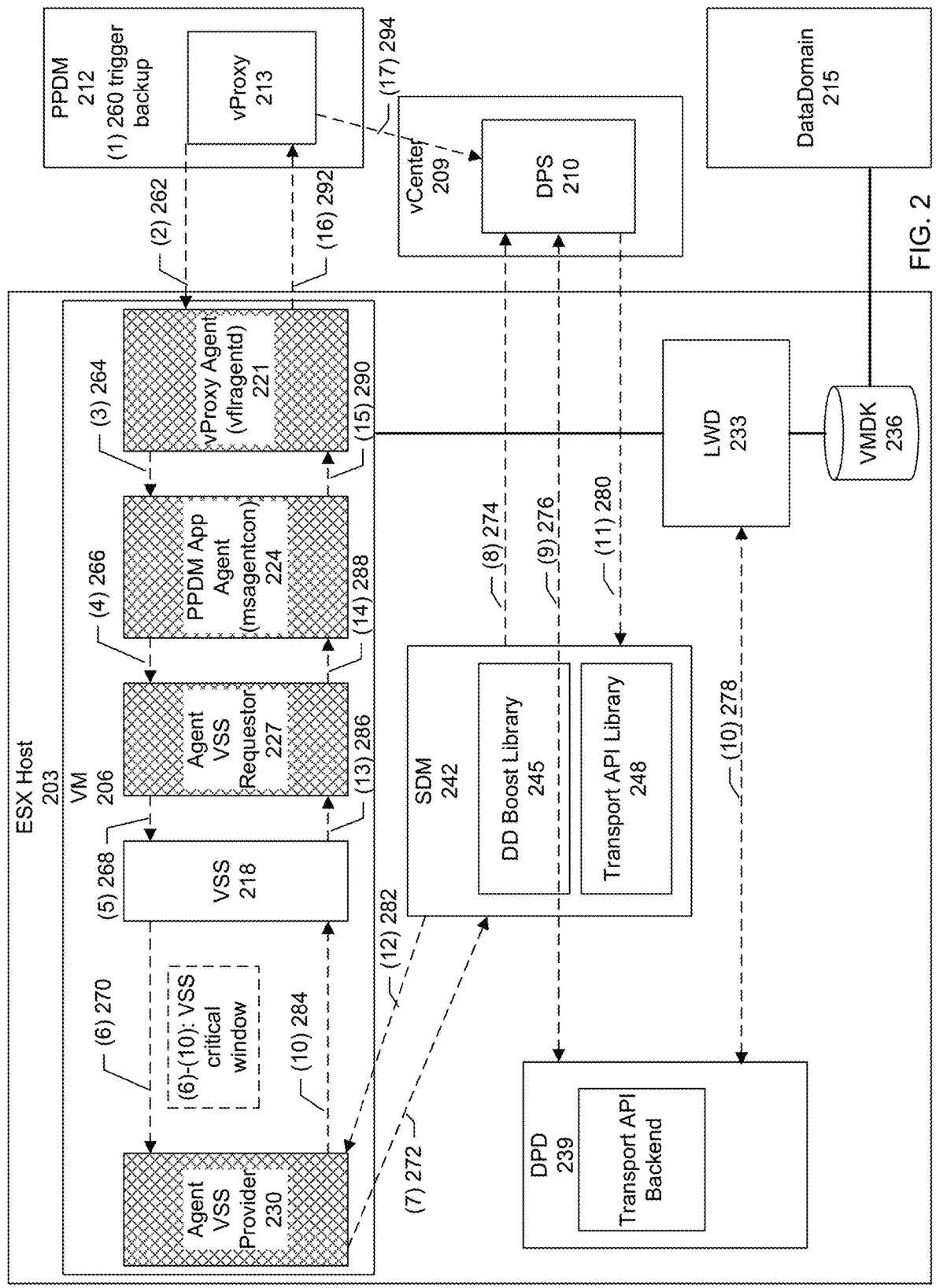
FIG. 2 shows a more detailed block diagram of components of the data protection backup system and interactions among the components, according to one or more embodiments.

FIG. 2 shows a more detailed block diagram of the data protection system including components of the in-guest data protection agent and transparent snapshot data mover, according to a specific embodiment. As shown in the example of FIG. 2, there is a host (e.g., ESXi host) 203 hosting a virtual machine 206, virtual machine management center (e.g., vCenter) 209 running data protection services (DPS) 210, data protection management server (e.g., PPDM) 212 running a virtual appliance (e.g., vProxy) 213 that triggers the backups and helps moves the data to be backed up from the virtual machine host to secondary protection storage (e.g., DataDomain) 215.

The virtual machine includes a copy service (e.g., VSS) 218 to facilitate snapshot generation. Components of the in-guest data protection agent installed within the virtual machine include vProxy agent 221, PPDM application agent 224, agent VSS requestor 227, and agent VSS provider 230. These components are shown with a pattern to indicate that they are part of the data protection agent and may be installed together as a bundle in the virtual machine.

The host further includes a light weight delta filter (LWD) 233 attached to a virtual machine disk 236 of the virtual machine (e.g., positioned between the virtual machine guest OS and virtual machine disk), a data protection daemon (DPD) 239, and a (transparent) snapshot data mover (SDM) 242 installed at a host-level of the host and outside or external to the virtual machine. The snapshot data mover includes a set of libraries including a DD Boost library 245 and transport API library 248. Broken lines indicate a control path. Solid lines indicate a data path.

The system shown in FIG. 2 provides not only backup and restore capabilities, but also an alternative way to reduce the adverse effects of the VM stun operation. More particularly, in an embodiment, transparent snapshots use the vSphere API for I/O (VAIO) filtering framework as provided by VMware. In an embodiment, the transparent snapshots data mover (TSDM) is deployed in the VMware ESXi infrastructure through an installation package that may be referred to as a PowerProtect Data Manager vSphere Installation Bundle (VIB) which creates consistent VM backup copies and writes the copies to the protection storage (e.g., PowerProtect DD).

On each ESXi host, the protection-related APIs and workflows from VMware are facilitated using a VAIO filter. Each ESXi communicates with the transparent snapshot data mover component, which is responsible for the VM-backup data movement. The backup and restore processes transfers the transparent snapshots respectively to and from the PowerProtect appliance. In an embodiment, TSDM also includes the PowerProtect Appliance SDK (DDBoost library) which helps the framework access the storage units on the PowerProtect Appliance. It also helps write and read data from those storage units.

More particularly, DD Boost provides a backup protocol having in-line deduplication to help reduce network traffic and conserve storage space during backups of data to secondary storage. In particular, as files and data sets are sent over the network, the DD Boost library deduplicates redundant data by writing only unique data segments to disk. DD Boost allows for a large part of the deduplication work to be performed before the data is sent over the network to secondary storage. Specifically, data at the backup source is segmented, fingerprinted or hashed, and compared with fingerprints or hashes of segments already on secondary storage. For example, a size of a segment may be about 8 KB. Thus, there can be many thousands or hundreds of thousands of segments (and corresponding segment fingerprints) for a large file or data object to be backed up. A fingerprint match indicates that the corresponding segment already resides at secondary storage and does not have to be re-transmitted. A non-matching fingerprint indicates that the corresponding segment is not yet at secondary storage and needs to be transmitted. The DD Boost protocol allows for reducing the amount of redundant data that is transmitted over the network.

In an embodiment, the transport API library includes a set of functions that allow the snapshot data mover to communicate with the data protection daemon running on the host, communicate with data protection services running on the virtual machine manager, obtain the data to be backed up, and help move and copy the data to secondary storage.

PowerProtect Data Manager (PPDM) manages the TSDM component. In an embodiment, this component is installed dynamically as part of the integration of PowerProtect Data Manager that requires protection of VMs using transparent snapshots. The APIs used are supported in VMware ESXi 7.0 U3 and later.

In an embodiment, the system shown in FIG. 2 provides support for application and file system consistent snapshots within a virtualized environment and without having to use the utilities or tools (e.g., VMware Tools) provided by the virtualization platform. In this embodiment, instead of VMware Tools, the in-guest PPDM agent is leveraged. In-guest credentials are collected during the creation of a backup data protection policy. These credentials can then be used by the data protection manager to connect with the in-guest agent.

In brief, when the data protection manager determines that a backup should be performed, vProxy sends a snapshot command to the in-guest vProxy agent. vProxy agent, in turn, communicates with other agent components running in the virtual machine to generate the snapshot. vProxy agent calls the data manager application agent (or msagentcon) which, in turn, calls the agent VSS requestor to request a snapshot from the VSS copy service or provider.

When the agent VSS copy service provider receives an instruction from the VSS copy service or agent VSS copy service requestor to provide a snapshot, the provider calls SDM to take the snapshot. SDM, in turn, communicates with the data protection services on the virtual machine manager (e.g., vCenter) to pass on the snapshot request. vCenter, in turn, communicates with their internal components including the data protection daemon (DPD) installed on the ESX host. DPD, in turn, reviews changes tracked by LWD to generate the snapshot. Once the snapshot has been generated, the virtual machine manager (e.g., vCenter) notifies the snapshot data mover. The snapshot data mover then notifies the agent VSS copy service provider of the snapshot. The provider can then inform the VSS copy service, requestor, or both of the snapshot so that any frozen or held operations can be thawed or released and the rollover or sync phase of the snapshot backup operation can begin.

More particularly, table A below provides detail for a specific flow show in FIG. 2.

TABLE A

| Step | Description |
|---|---|
| 260 | Backup management server vProxy determines that a backup of an application in a virtual machine hosted by a host (e.g., ESXi host) should be performed and triggers the backup. |

TABLE A-continued

| Step | Description |
|---|---|
| 262 | vProxy initiates a snapshot request to the data protection agent running in the virtual machine or, more specifically, to vProxy agent component running in the virtual machine. The snapshot request includes an authentication token for communicating with the virtual machine manager (e.g., vCenter). |
| 264 | vProxy agent passes the snapshot request to the PPDM application agent. |
| 266 | The PPDM application agent passes the snapshot request to the agent VSS requestor. |
| 268 | Agent VSS requestor issues a request to the VSS copy service for a snapshot. |
| 270 | VSS copy service instructs the agent VSS provider to create the snapshot. The copy service notifies writers to freeze operations and prepare for a snapshot. The issuing of the instruction triggers a time window within which the VSS copy service expects generation of the snapshot to be completed. |
| 272 | Agent VSS provider communicates, over a socket communication channel, the snapshot request to the snapshot data mover running outside the virtual machine at the host-level. |
| 274 | SDM, in turn, passes the snapshot request to the virtual machine manager (e.g., vCenter). |
| 276 | The virtual machine manager notifies the data protection daemon (DPD), running at the host-level, of the snapshot request. The virtual machine manager and DPD exchange communications throughout the snapshot generation process so that the virtual machine manager can track status. |
| 278 | DPD communicates with the light weight delta (LWD) filter about the snapshot so that changes to the associated virtual machine disk can be included in the snapshot and thus backed up to secondary storage. |
| 280 | Once the snapshot has been generated, the virtual machine manager or vCenter sends an identifier for the snapshot (e.g., snapshot universally unique identifier (UUID)) to the snapshot data mover. |
| 282 | Snapshot data mover passes the snapshot identifier to agent VSS provider. |
| 284 | Agent VSS provider notifies the VSS copy service of successful snapshot generation. The notification is accompanied by the snapshot identifier. |
| 286 | VSS copy service, in turn, notifies the agent VSS requestor of the successful snapshot generation and provides the requestor with the snapshot identifier. |
| 288 | Agent VSS requestor passes the snapshot identifier to PPDM app agent. |
| 290 | PPDM app agent passes the snapshot identifier to vProxy agent. |
| 292 | vProxy agent passes the snapshot identifier to the backup manager (e.g., vProxy). |
| 294 | vProxy notifies the virtual machine manager (e.g., vCenter) of the synchronization (or rollover) phase of the backup operation where data can be copied from the snapshot to secondary storage (e.g., Data Domain). |

Tables B-G below show further details for the flow shown FIG. 2. In particular, table B below shows detail of a flow of a protection workflow involving a file system-consistent snapshot, according to one or more embodiments.

TABLE B

| Step | Description |
|---|---|
| 1 | Inject PPDM AppAware agents into the VM guest space. |
| 2 | Execute in-guest PPDM agent for initial configuration and validation |
| 3 | Create VSS application-consistent snapshot by PPDM agent that ensures all VSS writers are included in VSS BT COPY mode which does not affect the backup chain. |
| 4 | Back up snapshot image to Data Domain. |

For VSS application aware snapshots, in-guest credentials are collected during the creation of a backup data protection policy. Table C below shows a flow of a protection workflow involving an application-consistent snapshot, according to one or more embodiments.

TABLE C

| Step | Description |
|---|---|
| 1 | Inject PPDM AppAware agents into the VM guest space. |
| 2 | Execute in-guest PPDM agent for initial configuration and validation. |
| 3 | Create VSS application aware snapshot by PPDM agent that ensures all VSS writers are included in VSS BT FULL mode which affects the backup chain. |
| 4 | Back up snapshot image to Data Domain. |
| 5 | Execute in-guest PPDM agent for cataloging the backup of in-guest assets as part of the image backup. |

Table D below shows a flow for an agent-based snapshot and, in particular, a setup flow.

TABLE D

| Step | Description |
|---|---|
| 1 | Install Step: Agent binaries comprised of PPDM VSS Requestor, VSS Provider will be installed and registered in guest OS. |
| 2 | Version Step: vProxy will initiate version command of msagentcon to check if the latest App Agent version is installed. |
| 3 | Configure step: vProxy will initiate configure command of msagentcon to Data Domain with all configuration details for backup. Agent Service registration with ADM/PPDM also takes place as a result. |
| 4 | Validate Step: vProxy will initiate validate command of msagentcon to validate MS SQL Server installation on the VM host. |

Table E below shows a flow for initiating a snapshot from vProxy to the data protection agent.

TABLE E

| Step | Description |
|---|---|
| 1 | Snapshot Step: vProxy will initiate snapshot request to agent with vCenter authentication token and MoRef of the same VM |
| 2 | In an embodiment, only one snapshot request is processed at a time. Overlapped requests will be rejected by agent. |
| 3 | Agent VSS requestor will trigger VSS snapshot (VSS_BT_FULL) with (snapshotSessionId, Auth token, MoRef) embedded in CONTEXT |
| 4 | Agent VSS Provider will receive CommitSnapshot notification |
| 5 | Agent VSS Provider communicate with SDMProxy service running on guest and send snapshot request with (BackupId, Auth token, MoRef) |
| 6 | SDM Proxy will communicate with SDM service running on ESX host over vSocket network and initiate snapshot request with (BackupId, Auth token, MoRef, TIMEOUT). Agent will decide the TIMEOUT value based on the application writer that is protected. For example, it has been observed that most of writers support 60 seconds extended timeout, MS Exchange writer timeout, however, is 20 seconds. |

Table F below shows a flow for SDM triggering the snapshot request and potential scenarios.

TABLE F

| Step | Description |
|---|---|
| 1 | SDM triggers snapshot request on vCenter/DPS |
| 2a | SDM receives SUCCESS response and passes snapshot UUID/vCenter-task-id to SDM Proxy within 10 seconds (Happy path) |
| 2b | SDM Proxy returns SUCCESS to VSS Provider |
| 2c | VSS Provider returns SUCCESS to VSS Requestor |
| 2d | VSS Requestor queries snapshot UUID/vCenter-task-id from SDM Proxy and passes that back to vProxy agent to vProxy |
| 3a | SDM receives FAILED response and passes that to SDM Proxy within 10 seconds (or writer/provider override) window |
| 3b | SDM Proxy returns FAILED + snapshot UUID/vCenter-task-id status to VSS Provider |
| 3c | VSS Provider returns FAILED + snapshot UUID/vCenter-task-id status to VSS requestor |
| 3d | VSS Requestor passes FAILED + snapshot UUID/vCenter-task-id status back to vProxy agent to vProxy |
| 4a | SDM receives FAILED/SUCCESS response after 10 seconds (or writer/provider override) window (unhappy path) |
| 4b | VSS Provider has already timed out and VSS requestor is notified of that |
| 4c | VSS Requestor checks with SDM Proxy on snapshotSessionId until LWD Snapshot API timeout window. In an embodiment, the TIMEOUT is set by agent itself with the snapshot request to SDM. |
| 4d | If SDM meanwhile has returned SUCCESS/FAILED+ snapshotUUID/vCenter-task-id<br>i) SDM Proxy returns FAILED + snapshotUUID/vCenter-task-id to VSS Requestor<br>ii) VSS Requestor returns FAILED + snapshotUUID/vCenter-task-id to vProxy Agent to vProxy<br>vProxy then is required to do the cleanup of the stale snapshot |
| 5a | SDM↔Agent disconnect OR SDM response times out |
| 5b | 1. VSS Provider returns FAILED to VSS Requestor |
| 5c | 2. VSS Requestor returns just FAILED status back to vProxy agent to vProxy. |

TABLE F-continued

| Step | Description |
|---|---|
| 5d | 3. In such cases, vProxy will make retry snapshot attempt which would eventually fail with DpFaultSnapshotInProgress if the snapshot from previous attempt still exists, vProxy cleans up the existing stale snapshot and reinitiates a fresh snapshot request. |

Table G below shows a flow upon the agent returning status of the snapshot request to vProxy.

TABLE G

| Step | Description |
|---|---|
| 1a | if STATUS is SUCCESS |
| 1b | i.) if vCenter-task-id is available<br>1. vProxy will initiate the DpSync() operation for the snapshot on vCenter<br>2. vProxy will periodically update the DpSync() operation progress status to msagentcon<br>3. If DpSync() operation progress status = ERROR \| NO DpSync( ) operation progress status is received for a TIMEOUT duration<br>a. Agent VSS Requestor (msagentsy) will report the backup failure to VSS. This will avoid any unwanted log truncation operation. |
| 1c | ii.) else vProxy will make an retry attempt of snapshot. |
| 2a | Else |
| 2b | i.) if vCenter-task-id is available<br>1. vproxy will initiate a DpCancelSnapshot() operation for the snapshot on vCenter<br>ii.) Else vProxy will make an retry attempt of Snapshot. |

In a catalog step, vProxy will initiate catalog command of msagentcon to record the last VSS full backup of, for example, Microsoft SQL Server in Data Domain.

Figure 3:
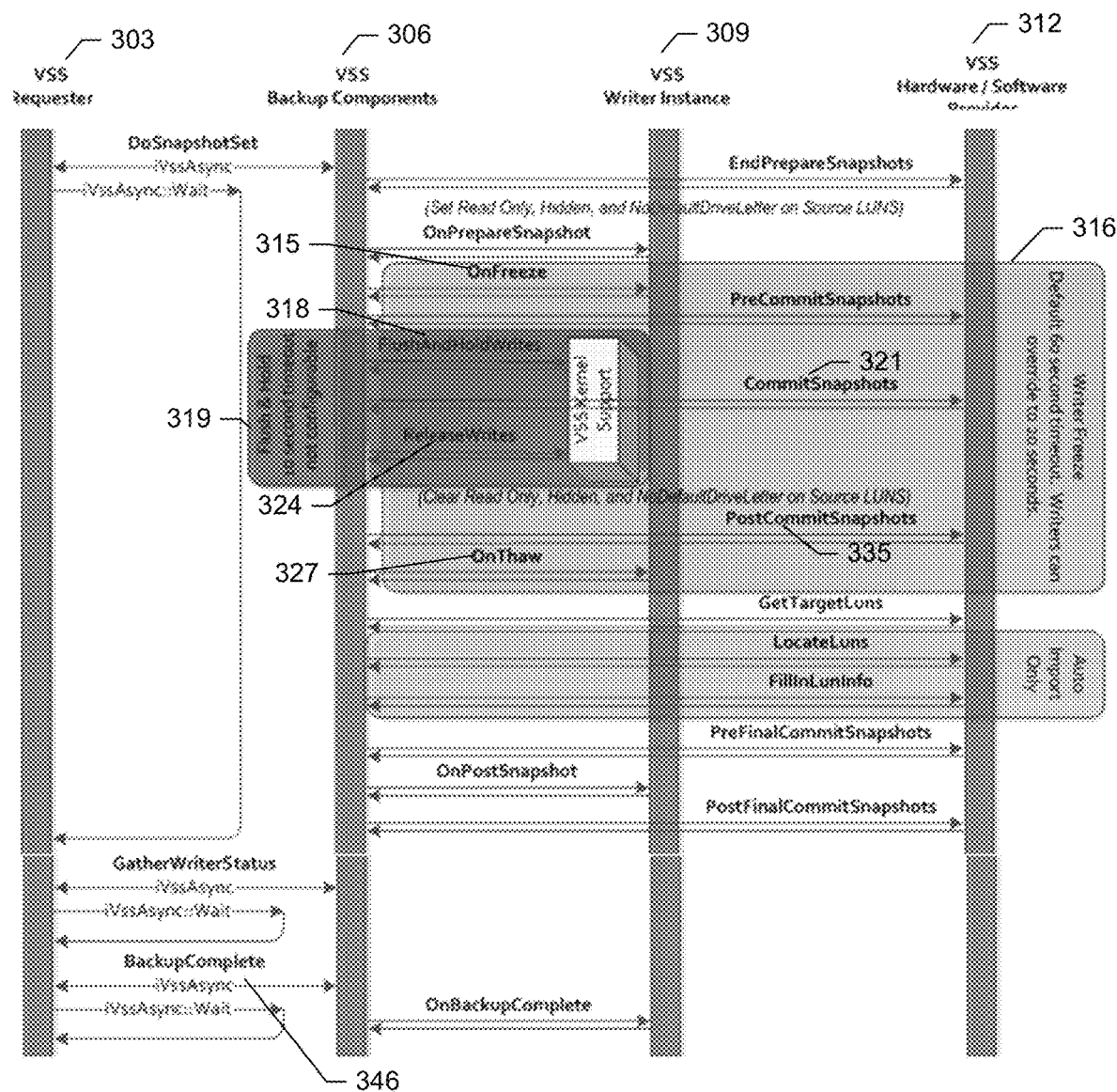
FIG. 3 shows a swimlane diagram of interactions among components of an in-guest data protection agent and copy service, according to one or more embodiments.

FIG. 3 shows a swimlane diagram of interactions between an agent VSS copy service requester 303, VSS copy service backup components 306, VSS writer 309, and agent VSS provider 312. The generation of a snapshot (or shadow copy) begins with the requester asking the VSS copy service to enumerate the writers, gather the writer metadata, and prepare for snapshot creation. Each writer creates an XML description of the components and data stores that need to be backed up and provides it to the copy service. The writer also defines a restore method, which is used for all components. The copy service provides the writer's description to the requester, which selects the components that will be backed up. The copy service notifies all the writers to prepare their data for making a snapshot. Each writer prepares the data as appropriate, such as completing all open transactions, rolling transaction logs, and flushing caches. When the data is ready to be snapshotted, the writer notifies the copy service.

Specifically, in a step 315, the copy service instructs the writers to temporarily freeze application write I/O requests for the few seconds that are typically required to create the snapshot of the volume or volumes. The OnFreeze API call to a particular writer freezes that particular writer such that the corresponding application (e.g., SQL Server) holds writes in memory. Writes are held until the OnThaw API is called (327). In other words, application writes between the OnFreeze and OnThaw calls are held in memory and not written to disk.

Generally, the application freeze is not allowed to take longer than 60 seconds. Thus, there is a first time window 316 within which application write I/O requests are frozen. In a step 318, the copy service flushes the file system buffers and then freezes the file system, which ensures that the file system metadata is recorded correctly and the data to be snapshotted is written in a consistent order. Thus, there is a second time window 319, inside the first time window, within which the file system is also frozen. The duration of the second time window is less than the duration of the first time window. In a step 321, the copy service instructs the provider to create the snapshot. Generally, the copy service expects the snapshot creation period to last no more than 10 seconds, during which all write I/O requests to the file system remain frozen.

In a step 324, the copy service releases file system write I/O requests. In a step 327, the copy service tells the writers to thaw application write I/O requests. At this point applications are free to resume writing data to the disk that is being snapshotted. Once the snapshot has been successfully created, the copy service returns the location information for the snapshot to the requester.

As discussed, VMware 7.0.3 has introduced a new capability of snapshotting VMKD disks that is intended to address performance issues on the production virtual machines such as VM-stun, snapshot timeout, and so forth. This feature may be referred to as light-weight-delta (LWD) based transparent snapshots. In this VMWare feature, however, there is no support for in-guest application consistency. There is a need for application consistency with LWD snapshots.

Application consistency on Windows virtual machines is managed by Microsoft Volume Shadow Copy Services. In an embodiment, the data protection system includes a generic PowerProtect VSS requestor and provider components and a daemon service that may be referred to as snapshot data manager (SDM) or transparent snapshot data mover (TSDM) which runs on the ESX host server where the virtual machine is hosted.

Figure 4:
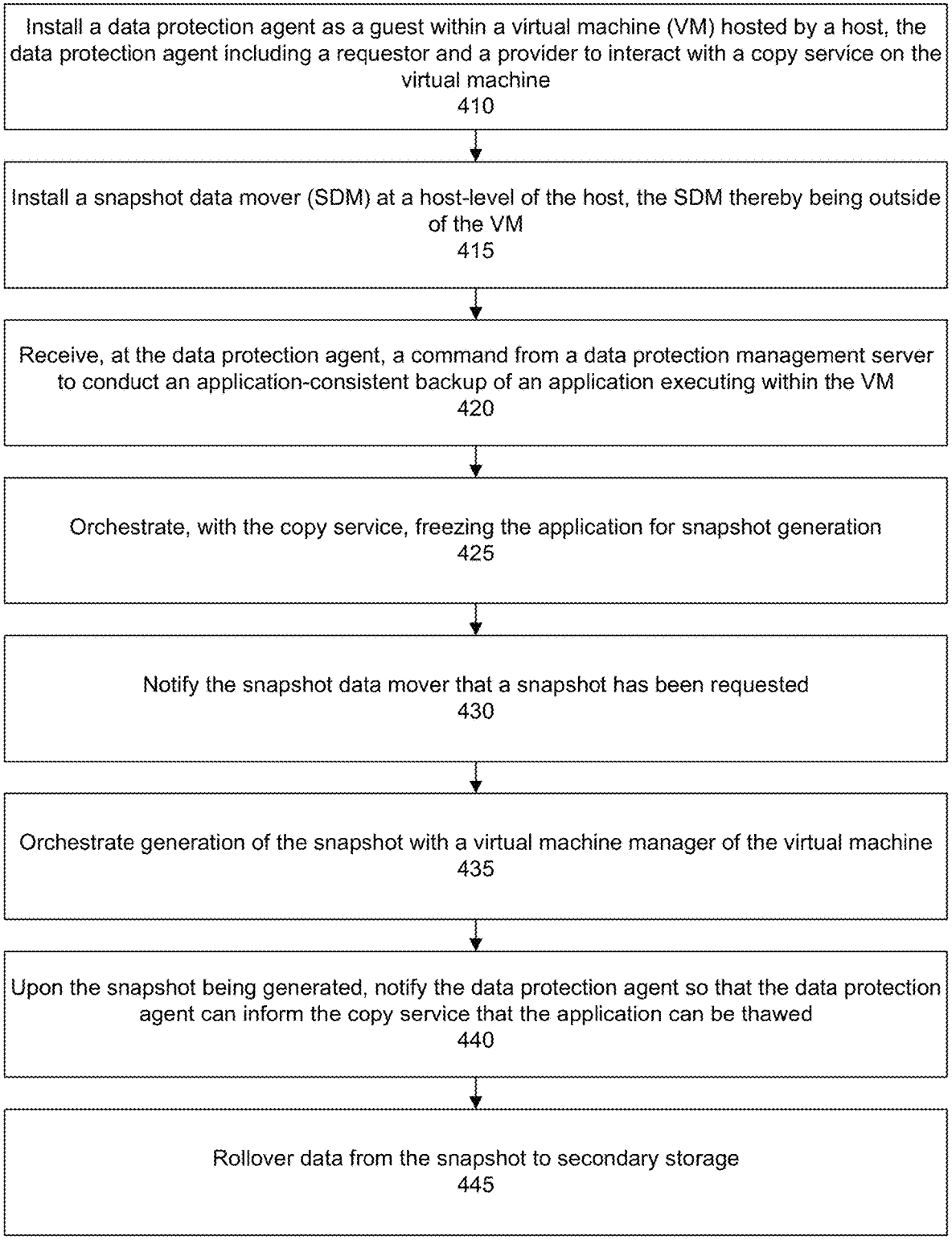
FIG. 4 shows an overall flow of conducting application awareness protection, according to one or more embodiments.

More particularly, FIG. 4 shows a flow diagram for transparent snapshot-based application-consistent virtual machine protection. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 410, a data protection agent is installed as a guest within a virtual machine hosted by a host. This in-guest data protection agent includes components including a requestor and a provider to interact with a copy service on the virtual machine.

In a step 415, a snapshot data mover (SDM) is installed at a host-level of the host, the SDM thereby being outside of the virtual machine.

In a step 420, the data protection agent receives from a data protection management server, a command to conduct an application-consistent backup of an application executing within the virtual machine.

In a step 425, the data protection agent orchestrates, with the copy service, a freezing or quiescing of the application for snapshot generation.

In a step 430, the data protection agent notifies the snapshot data mover that a snapshot has been requested.

In a step 435, the snapshot data mover orchestrates generation of the snapshot with a virtual machine manager of the virtual machine.

In a step 440, upon the snapshot being generated, the snapshot data mover notifies the data protection agent of the snapshot so that the data protection agent can inform the copy service that the application can be thawed.

In an embodiment, the requestor is responsible for notifying the Windows VSS-aware enterprise applications (such as SQL, Exchange, SharePoint, or Oracle) as well as the file system to freeze all I/O operations for a restricted 10 second window. The VSS provider is invoked in the beginning of this window and immediately triggers the snapshot request to SDM running on the ESX host via a vSocket communication channel. SDM now in turn, communicates with the VMWare native components to create an LWD snapshot of the VMDK disks pertaining to the virtual machine. Because LWD is designed to generate snapshots very quickly, SDM can (in most cases) return the snapshot response back to the VSS provider within the 10 second window without any delay. As discussed, VSS copy service operations are highly time bound. The system design shown in FIGS. 1 and 2 help to avoid a VSS snapshot timeout and thus ensure a very high number of successful snapshots within the critical timeout window.

The system further overcomes the problems with the VADP approach such as stunning the VM while taking the snapshot, prolonged durations to consolidate the snapshots in the critical VSS window of 10 seconds thereby causing the whole snapshot operation to timeout.

In an embodiment, the requestor is responsible for freezing the writers required for the application consistency of the application(s) selected during the policy creation. The requestor includes logic and intelligence to detect the current status of the writers and check if a writer restart is required or if the snapshot operation can proceed. As discussed, the requestor is able to check a status of the freeze because the requestor is installed as a guest within the virtual machine. If there is a problem with the freeze, the requestor will not proceed with the snapshot request to the snapshot data mover. The requestor saves the writer metadata (WMD) and VSS backup component document (BCD) to the secondary storage system (e.g., Data Domain appliance), which will be used during the restore. In an embodiment, the requester provides the backup type as VSS_BT_COPY or VSS_BT_FULL as requested by the policy.

Figure 5:
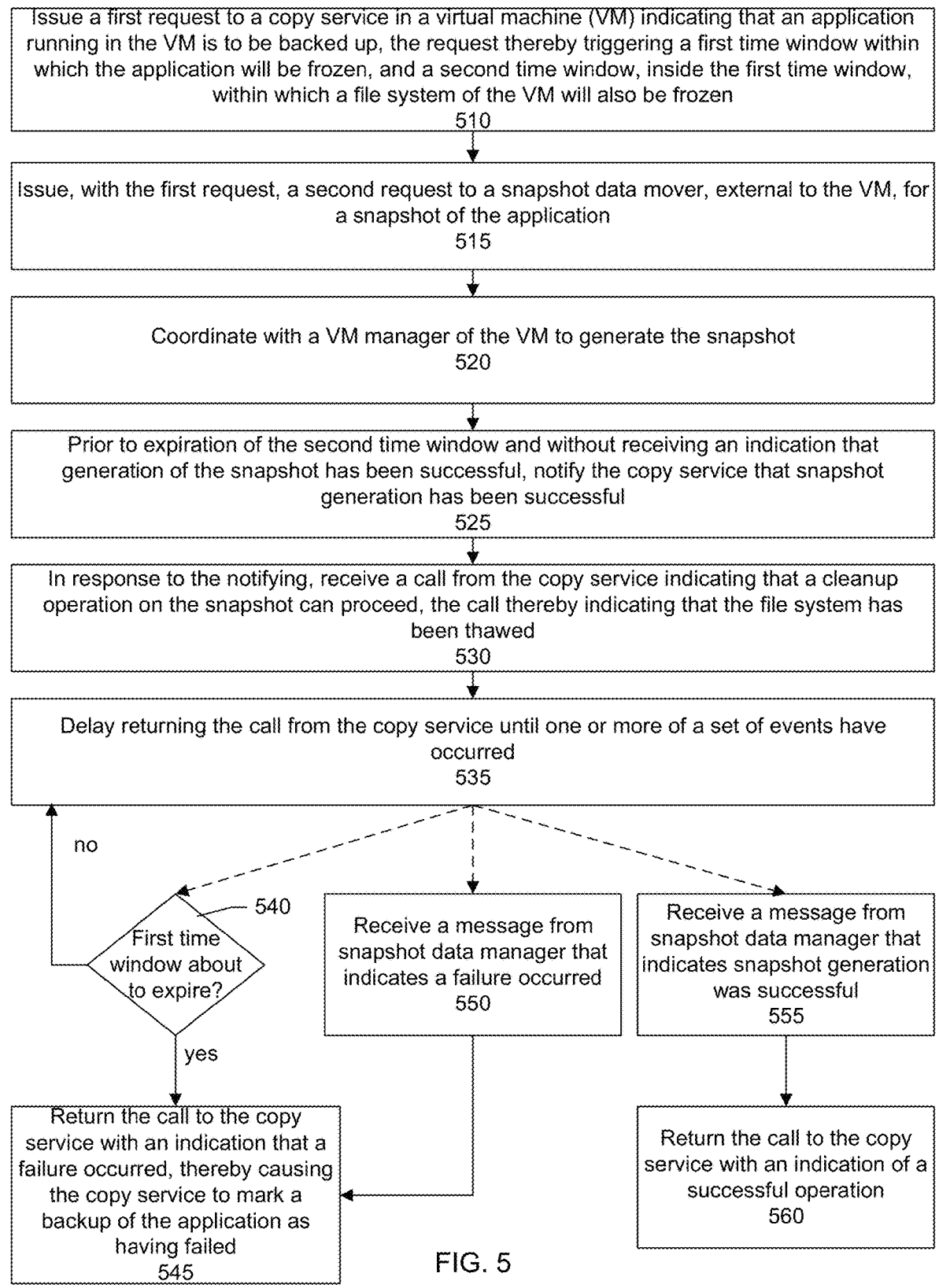
FIG. 5 shows a flow for extending a time period for snapshot generation, according to one or more embodiments.

FIG. 5 shows a flow for intelligently extending the time for an application-consistent snapshot backup and avoiding a time out by the VSS copy service. As discussed, application consistency on Windows virtual machines is managed by Microsoft Volume Shadow Copy Services (VSS). In an embodiment, snapshot operations are initiated by the VSS requestor to the Microsoft VSS framework. The VSS framework then communicates with all the available VSS writers on the system. A VSS writer is a service that represent a specific enterprise application and enables communication between that application and the VSS framework. When a snapshot request is triggered in the VSS layer, the VSS copy service framework or requestor communicates with the VSS writers to freeze the I/O operations of the enterprise application thereby providing a window of time to take an external snapshot which will be application-consistent in turn.

As shown in the example of FIG. 3, however, window of time 319 for which the VSS copy service will hold all the writes to the system is very short, e.g., 10 seconds, and the VSS copy service does not permit this time window to be extended. While the use of light weight delta filters have dramatically decreased the time required to generate a snapshot, there nonetheless remain cases where snapshot generation requires more time than that formally allotted by the VSS copy service.

It has been observed that the VSS copy service will timeout a snapshot request in many customer scenarios where, for example, the I/O rate is very high or the VADP snapshot consolidation is taking more than 10 seconds or the vCenter is too overloaded that the VADP snapshot request is spending some of this critical time in a waiting queue.

Prior techniques involving VADP snapshots lacked control on how the VSS provider was handling the snapshot request since VMWare used its proprietary VMTools requestor and provider.

AppAware transparent snapshots, however, include a VSS hardware provider and other components having logic to more intelligently interface with the VSS copy service framework in order to artfully manipulate the time windows and effectively extend the snapshot window.

In an embodiment, a technique to extend the snapshot window time involves use of first time window 316 (FIG. 3) that is trigged upon issuance of the OnFreeze call to all the writers VSS has to make sure the writers are not accepting any new input. This results in waiting in the CommitSnapshots method for only for about 7-8 seconds instead of waiting for the response from TSDM. Two cases arise with this.

In a first case, if a response from the TSDM is received within about 7-8 sec, then a success is returned from the CommitSnapshots method and the rest workflow runs normally.

In a second case, if the response from TSDM is not received within about 7-8 sec, then a success is still returned from the CommitSnapshots method, thereby manipulating the VSS copy service into believing that the snapshot was completed successfully. A wait then begins for a response from the TSDM in the PostCommitSnapshots method. This provides some extra time (e.g., about 40 seconds) to complete the snapshot. The important thing to note here is that the writers are still in a frozen state and will only be thawed after a return from the PostCommitSnapshots method. If, however, a response from TSDM has not been received or snapshot generation has failed from the VMWare side, a failure is returned from the PostCommitSnapshots method and the VSS copy service will fail the whole workflow and mark the current snapshot set as incomplete.

In other words, rather than immediately returning from the PostCommitSnapshots method, a technique involves holding within the method or function to provide additional time past the 10-second flush and hold window (e.g., second time window 319), if needed, for the snapshot to be generated and the snapshot data mover to provide the snapshot identifier to the agent VSS provider. The additional time given to the snapshot generation process allows for reducing the number of attempts needed to generate a snapshot.

This technique provides an extended window of time to finish the snapshot and then let the VSS copy service handle the remaining operations. It has been observed that time window 316 (FIG. 3) is merely the writer freeze timeout which depends on the initialization of the writers to CVssWriter::Initialize API; which also varies from writer to writer. In an embodiment, the in-guest requestor included with the data protection agent includes intelligence or logic to let the provider know the extra time to wait based the application being protected.

Referring now to FIG. 5, in a step 510, a first request is issued to a copy service of a virtual machine indicating that an application running in the virtual machine is to be backed up, the first request thereby triggering a first time window within which the application will be frozen, and a second time window, inside the first time window, within which a file system of the virtual machine will also be frozen. In other words, the second time window overlaps with the first time window. A duration of the second time window is less than a duration of the first time window. The first time window may be referred to as a writer freeze window.

In a step 515, a second request is issued in conjunction with the first request to a snapshot data mover, external to the virtual machine, for a snapshot of the application.

In a step 520, communications are exchanged with a virtual machine manager of the virtual machine to coordinate generation of the snapshot.

In a step 525, prior to expiration or a lapsing of the second time window and without having received an indication that generation of the snapshot has been successful, a notification is provided to the copy service that snapshot generation has been successful.

In a step 530, a call or indication responsive to the notification is received from the copy service indicating a cleanup operation on the snapshot can proceed, the call thereby indicating that the file system has been thawed.

In a step 535, returning the call from the copy service is delayed until one or more of a set of events have occurred. A first event may include the first time window about to expire. A second event may include receiving a message from the snapshot data mover indicating that a failure occurred. A third event may include receiving a message from the snapshot data manager indicating that snapshot generation was successful.

In particular, in a step 540, a determination is made as to whether the first time window is about to expire. The determination may be made based on an amount of time remaining until the first time window is to expire. For example, the threshold may be configured as 3, 2, or 1 second, or other threshold. The threshold may be a predetermined percentage value based on the total amount of time allowed in the first time window. Considering a 2 second threshold, once there are 2 seconds remaining until expiration of the first time window, a determination may be made that the first time window is about to expire. The determination triggers returning the call to the copy service with an indication that a failure occurred, thereby causing the copy service to mark a snapshot backup of the application as having failed. Alternatively, the first time window may be allowed to lapse, thereby causing a similar result with the copy service detecting a timeout condition and marking the snapshot backup as having failed.

Alternatively, when the determination is that the first time window is not about to expire (e.g., 2 or more seconds remaining until expiration), the process loops back to delaying returning the call from the copy service (step 535).

In a step 550, when a message is received from the snapshot data manager indicating that a failure occurred, within the first time window, the process immediately advances to returning the call to the copy service indicating that a failure occurred (step 545).

In a step 555, when a message is received from the snapshot data manager indicating a successful snapshot generation, within the first time window, the process immediately advances (step 560) to returning the call to the copy service with an indication of a successful operation.

The technique show in FIG. 5 and described in the accompanying discussion effectively extends the 10-second window (e.g., second time window 319—FIG. 3) within which the VSS copy service expects snapshot generation to be completed. The second time window may be referred to as the flush and hold window.

The OnFreeze and OnThaw methods are called by the VSS copy service to the application writer. Calling OnFreeze to the application writer (e.g., SQL Server writer) instructs the corresponding application (e.g., SQL Server) to hold its writes. Thus, during the freeze, any writes are to memory rather than disk. Calling OnThaw to the application writer instructs the corresponding application to resume writing (e.g., resume writing to disk). The duration, period, or length of time between the OnFreeze and OnThaw calls bracketing first time window 316 can be significantly greater than second time window 319 during which the file system is also frozen. That is, the time between the agent VSS provider sending the snapshot request to the snapshot data mover and the snapshot data mover responding back to the agent VSS provider with the snapshot identifier can slip past the 10-second flush and hold window prescribed by the VSS copy service.

An application-consistent snapshot, however, can be generated without necessarily having file system consistency. Notifying the VSS copy service within second time window 319 (flush and hold window) that snapshot generation has been successful (step 525, FIG. 5)—even when the agent VSS provider has not received such an indication from the snapshot data mover—avoids at least temporarily the VSS copy service from declaring that snapshot generation has failed. The VSS copy service can proceed as normal and release the file system writes.

Once the flush and hold window (e.g., second time window 319 (FIG. 3)) has expired, there still remains some time in first time window 316 during which the OnThaw method is yet to be called thereby providing additional time to complete generation of the snapshot. While the snapshot may not be file system consistent since the VSS copy service will have called the ReleaseWrites method (324) to allow file system writes, the snapshot will be application-consistent since the OnThaw method (327) is yet to be called.

More particularly, in an embodiment, the CommitSnapshots method 321 is called when the snapshots or shadow copies should be taken. For each prepared LUN in this snapshot copy set, the agent VSS provider performs the work required to persist the point-in-time LUN contents.

While this method is executing, both applications and the I/O subsystem are largely quiescent. The VSS copy service expects the agent VSS provider to minimize the amount of time spent in this method. This method is called during the flush and hold window, and VSS kernel support will cancel the flush and hold if the release is not received within 10 seconds, which would cause VSS to fail the snapshot or shadow copy creation process.

Thus, in an embodiment, the agent VSS provider indicates a release of the flush and hold (e.g., returns success from the CommitSnapshots method) before expiration of the 10-second flush and hold window even if the agent VSS provider has not yet received the snapshot identifier from the snapshot data mover confirming that the snapshot was successfully generated. Once the agent VSS provider's CommitSnapshots method returns, the VSS copy service releases all pending writes on the source LUNs.

Although the I/O subsystem will no longer be quiescent once the agent VSS provider returns from the CommitSnapshots method, the application will still remain in a quiescent state which is sufficient for an application-consistent snapshot.

The PostCommitSnapshots method is called after the agent VSS provider involved in the snapshot has returned success from the CommitSnapshots method. The PostCommitSnapshots method is intended by the VSS copy service to be an opportunity for the agent VSS provider to perform additional cleanup work after the snapshot or shadow copy commit. That is, the VSS copy service notifies the agent VSS provider that cleanup work associated with generating the snapshot can proceed (e.g., removing temporary files). Applicant has appreciated, however, that while the lock on the I/O subsystem has been lifted, the applications have not yet been unfrozen. Thus, in an embodiment, a technique to extend the time available for snapshot generation includes delaying or holding a return while in the PostCommitSnapshots method.

The duration of the delay can vary depending on the particular application being snapshotted. In an embodiment, a technique to extend the time available for generating a snapshot includes identifying the application and setting a length of the delay based on the identification. An application identified as a first application (e.g., SQL Server) may be associated with a first length of delay. An application identified as a second application (e.g., Exchange) may be associated with a second length of delay, different from the first length of delay.

Consider, as an example, that snapshot generation requires an amount of time that is longer than the 10-second flush and hold window (second time window 319) prescribed by the copy service. While use of lightweight delta filters (LWD) have resulted in a rapid decrease in snapshot generation times, there can still be cases where snapshot generation exceeds 10 seconds. A virtual machine may be very heavily loaded, provisioned with insufficient resources, or both. In such a case, there exists a possibility that the time required for—(1) the agent VSS provider to send a snapshot request to the snapshot data mover (step 272, FIG. 2) and (2) receive, at the agent VSS provider, the snapshot response from the snapshot data mover (step 282, FIG. 2)—will exceed 10 seconds. Nonetheless, so long as first time window 316 has not lapsed (e.g., OnThaw not called), the application will still be frozen and an application-consistent backup can still be achieved.

In particular, when the CommitSnapshots method (see, e.g., FIG. 3) is called by the VSS copy service to the agent VSS provider, the agent VSS provider includes logic to wait for about 7-8 seconds or until about expiration of second time window 319 for the snapshot data mover to return a response regarding the snapshot. Given a maximum length of the second time window of 10 seconds, 7-8 seconds represents about 70-80 percent of the available time. If the agent VSS provider has not received the response from the snapshot data mover within about 7-8 seconds or the lapse of the second time window, the agent VSS provider will nonetheless indicate to the VSS copy service that snapshot generation was successful. That is, the agent VSS provider will indicate that it has succeeded with the CommitSnapshots method rather than timing out the snapshot operation and requesting a retry.

After the agent VSS provider has indicated success with CommitSnapshots, the VSS copy service calls PostCommitSnapshots method 335 to the agent VSS provider. The PostCommitSnapshots method indicates that the lock on the I/O system has been lifted (e.g., the file system has been thawed) and is intended to be an opportunity for the provider to perform additional cleanup work while the application is still frozen though the lock on the I/O system has been lifted. In this method, the agent VSS provider holds or delays returning the call so as to provide extra time (e.g., 20 or 40 seconds) for the response from the snapshot data mover to be received.

Once the snapshot data mover responds to the agent VSS provider with an indication of successful snapshot generation, the agent VSS provider can return the PostCommitSnapshots method to the VSS copy service with an indication of a successfully completed operation (step 560) and the remaining operations, such as roller or sync, can proceed as normal.

It has been observed that a length of the delay can be up to 80 seconds. That is, in some cases, an application can remain frozen for up to 80 seconds. The duration, however, varies depending upon the application being snapshotted. Thus, in an embodiment, a length or duration of the delay in returning the call to the copy service (step 535) varies based on the application that is being snapshotted. Different application writers are associated with different durations after which the VSS copy service calls the OnThaw method. For example, an Exchange writer may allow up to 20 seconds before the OnThaw method is called. SQL Server writer may allow up to 60 seconds before the OnThaw method is called.

In an embodiment, the in-guest data protection agent, e.g., agent VSS requestor, includes logic to identify the application being snapshotted and determine, from the identification, a duration of first time window 316 for which the application can remain frozen. The agent VSS requestor communicates the duration or identification of the application to the agent VSS provider. This allows the agent VSS provider to determine how long it can delay responding to the VSS copy service while waiting for a response to the snapshot operation from the snapshot data mover.

The length of the delay (and thus additional time available for snapshot generation) can be determined based on the identification of the application. Different applications may be associated with different delays. For example, an application identified as a first application may be associated with a first delay, after which the copy service will thaw the first application. An application identified as a second application may be associated with a second delay, different from the first delay, after which the copy service will thaw the second application. In an embodiment, a delay table may be configured that cross references the applications with the amount of delay that is available. The data protection agent can review the table during the snapshot generation process of an application to calculate, obtain, or determine the length of delay that is available for generating an application-consistent snapshot of the application.

In an embodiment, a method includes identifying an application for which an application-consistent snapshot is to be generated; and based on the identification of the application, obtaining a length of time provided by a first time window within which the application will be frozen, the first time window being greater than a second time window within which a file system will remain frozen, the length of time thereby indicating an amount of additional time that is available for the snapshot to be generated.

The in-guest data protection agent, in conjunction with the host-level snapshot data mover, provides for identifying the time windows prescribed by the copy service, manipulating and operating within the time windows, timing when copy service methods should be called, timing delays in returning responses to the copy service, and obtaining guest application (and file system) state to ensure that the application or appropriate writers are frozen.

In an embodiment, a method for generating an application-consistent snapshot includes: identifying whether an application executing within a virtual machine to be backed up is a first application or a second application; when the application is identified as the first application, indicating to a copy service provider that a first length of time is provided for generation of the application-consistent snapshot of the application; and when the application is identified as the second application, indicating to the copy service provider that a second length of time, different from the first length of time, is provided for generation of the application consistent snapshot of the application.

Figure 6:
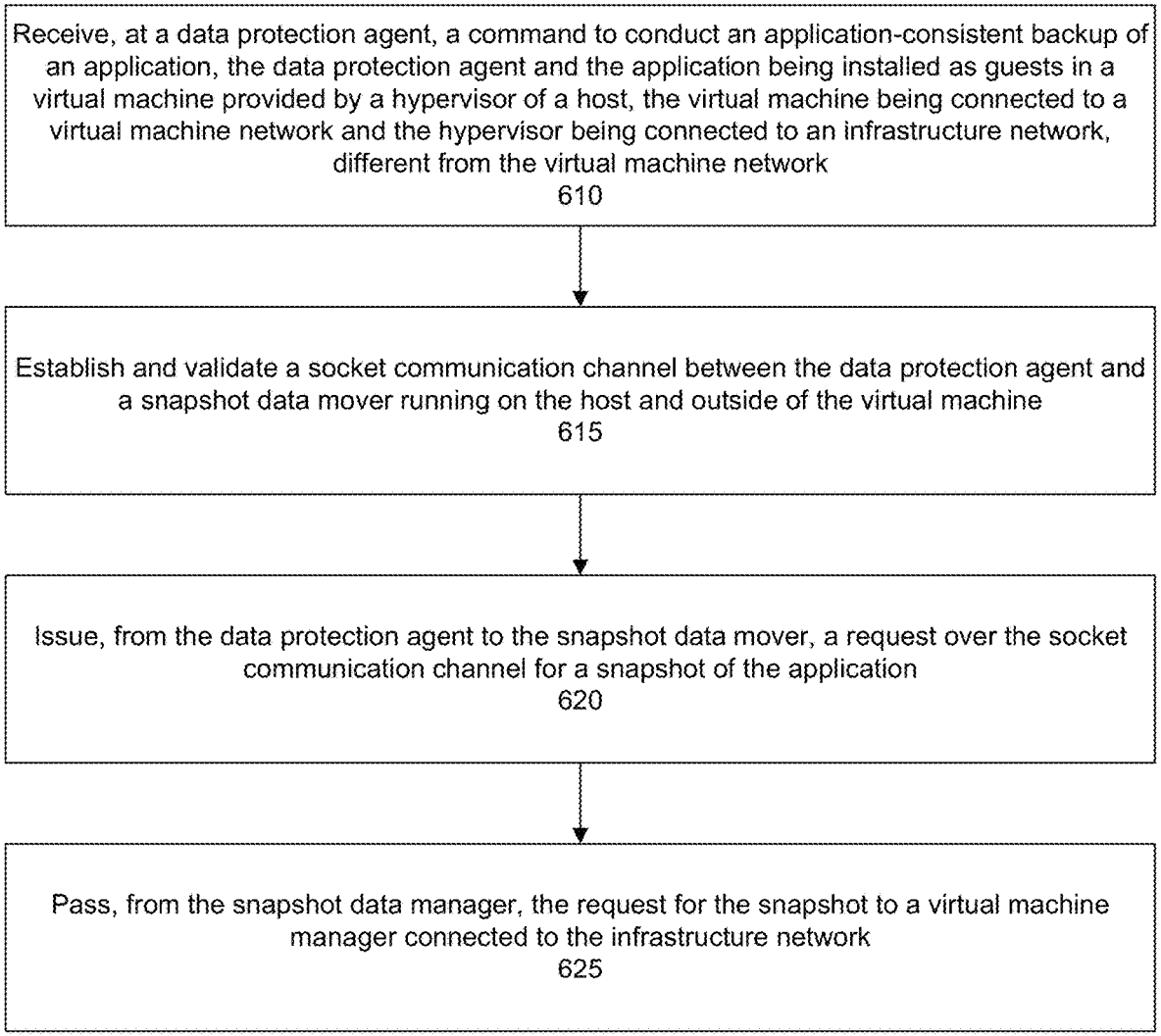
FIG. 6 shows a flow for secure communication between an in-guest data protection agent and host-level snapshot data mover, according to one or more embodiments.

FIG. 6 shows a flow for exchanging communications between the in-guest data protection agent of the virtual machine and virtual machine management center when the virtual machine and virtual machine management center (e.g., vCenter) are on different or separate networks. In an embodiment, the technique achieves TSDM based application-consistent snapshot by enabling secure vSocket communication in the absence of network connectivity between the in-guest agent and vCenter.

In particular, in a step 610, the data protection agent receives a command to conduct an application-consistent backup of an application. The data protection agent and application are installed as guests in a virtual machine provided by a hypervisor of a host. The virtual machine is connected to a first network (e.g., virtual machine guest network) and the hypervisor or host is connected to a second network (e.g., infrastructure network), different from the virtual machine guest network. For example, the first and second networks may be associated with different routers, switches, gateways, subnets, masks, or combinations of these.

In a step 615, a socket communication channel is established and validated between the in-guest data protection agent and a snapshot data mover running on the host and outside of the virtual machine. The data protection agent initiates a socket connection request using the vSocket library to the snapshot data mover. The snapshot data mover validates the connection request. The validation helps to ensure that the connection request to the snapshot data mover is from a valid source.

For example, in an embodiment, there can be a registration process where virtual machines to be protected are registered by the data protection management server. The data protection management server maintains a listing of valid virtual machines. When the snapshot data mover receives a connection request from a virtual machine, the snapshot data mover can consult the virtual machine registration list to determine whether the request is from a listed virtual machine. A connection request from a virtual machine not on the registered list may be denied. A connection request from a virtual machine on the registered list may be allowed. The socket communication channel is established and validated before issuance of a request to freeze the application for snapshotting. For example, the socket communication channel may be established when the agent receives a backup request from the data protection management server. The agent establishes the socket communication channel and after establishment of the socket communication channel issues the freeze request to the copy service. This helps to ensure that time is not wasted during the critical freeze windows to establish the communication channel with the snapshot data mover.

In a step 620, a request is issued from the in-guest data protection agent to the snapshot data mover, over the socket communication channel for a snapshot of the application.

In a step 625, the request for the snapshot is passed from the snapshot data manager to a virtual machine manager that is connected to the infrastructure network.

In customer environments the virtual machine (or application running in the virtual machine) that is being protected may not always be on the same network as the virtual machine manager (e.g., vCenter). In an embodiment, the virtual machine manager exposes an API (e.g., vCenter REST API) to facilitate snapshot generation of the virtual machines that it manages. As discussed, installation of the data protection agent as a guest within the virtual machine allows for interacting with the guest application and guest OS copy service (e.g., VSS) to properly quiesce the application for an application-consistent snapshot.

In many cases, however, virtual machines or, more particularly, guest software application programs or processes within the virtual machines are blocked from communicating directly with the virtual machine manager for purposes of security. The guest network is isolated from the infrastructure network. The lack of direct network connectivity from the virtual machine to the virtual machine manager helps to limit attacks on the virtual machine manager (and thus other virtual machines and infrastructure components) by a compromised virtual machine. For example, the compromised virtual machine will not be able to overwhelm the virtual machine manager with a denial of service (DOS) attack.

The virtual machine manager, e.g., vCenter, is considered a protected entity within the data center. To allow the virtual machines or, more particularly, the in-guest programs including the agent VSS provider, to communicate directly with the virtual machine manager exposes a security risk. The snapshot data mover, however, is a host-based component or daemon process running on the host itself. Data center components including the host (e.g., ESXi host), storage system, virtual machine manager, and data protection management server are infrastructure components or part of the data center infrastructure. For purposes of security, tenants (e.g., virtual machines or in-guest applications and programs) are blocked from making direct contact.

In an embodiment, the snapshot data mover handles authenticating and validating requests from the agent VSS provider. A security handshake and communication protocol is provided between the agent VSS provider and snapshot data mover. For example, if the snapshot data mover cannot authenticate a snapshot request from the agent VSS provider or cannot validate that the request is originating from a genuine source, the snapshot data mover will deny the request and will not pass the request to the virtual machine manager. The snapshot data mover may be configured with a threshold frequency setting of snapshot requests. When a number of snapshot requests within a rolling time period exceeds the threshold, the requests may be blocked or dropped. The snapshot data mover can serve as a gateway to filter, regulate, or buffer the number of requests that are passed to the virtual machine manager. This helps to ensure that the virtual machine manager does not become overloaded with an excess number of requests. Invalid snapshot or other requests are blocked before ever reaching the virtual machine manager. The snapshot data mover can provide gatekeeping functions to the virtual machine manager.

In an embodiment, the snapshot data mover functions as an intermediary to call the vCenter REST API to generate the transparent snapshot. The snapshot data mover can forward the snapshot request on behalf of the in-guest data protection agent.

Now to call the snapshot data mover API for snapshot there exists the same dilemma again as the snapshot data mover is running on the underlying ESX host (e.g., virtual machine host) which may again be not reachable from the virtual machine network. In an embodiment, a vSockets based protocol is provided to pass on the snapshot request to snapshot data mover and the snapshot data mover then calls the corresponding vCenter API for the transparent snapshot.

The VMware vSockets library offers an API that is like the Windows socket interface. The vSockets library, built on the VMCI device, supports fast and efficient communication between guest virtual machines and their host. Like local UNIX/Windows sockets, vSockets functions on an individual physical machine, and can perform interprocess communication on the local system and allow guest virtual machines to communicate to the host on which they reside. In an embodiment, the socket communication channel between the in-guest data protection agent and snapshot data mover is bidirectional between the two end-points. This allows the snapshot data mover to respond back to the in-guest data protection agent with the snapshot identifier or with an error message should snapshot generation fail. Routing requests and communications from the guest virtual machine through the host snapshot data mover to the virtual machine manager helps to maintain the virtual machine manager as a protected entity.

Figure 7:
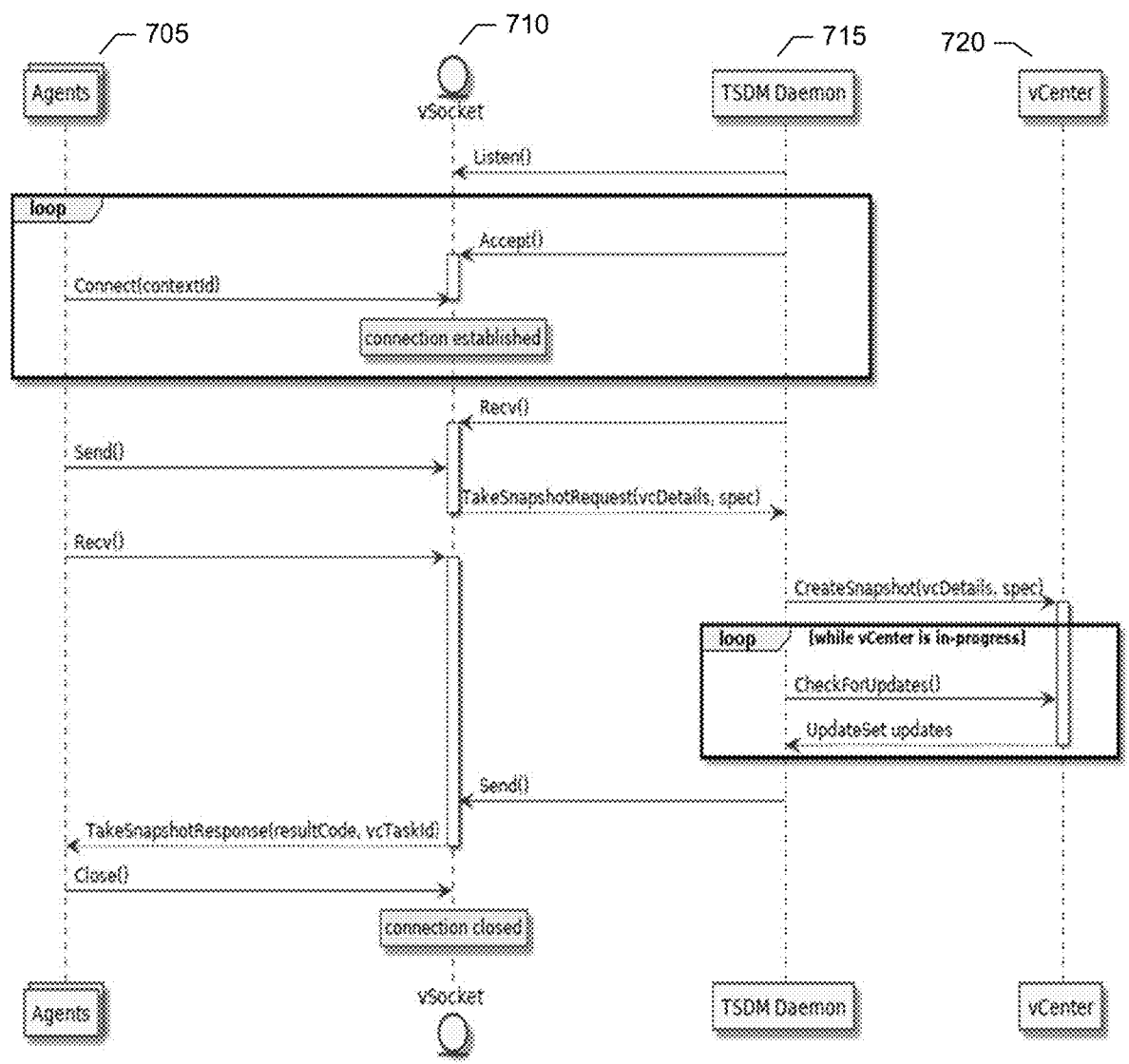
FIG. 7 shows a swimlane diagram illustrating communication among the in-guest data protection agent, host-level snapshot data mover, and virtual machine management center, according to one or more embodiments.

FIG. 7 shows a swimlane diagram of establishing and exchanging communications over a socket communication channel, including interactions among the in-guest data protection agent, snapshot data mover, and virtual machine manager, to generate an application-consistent snapshot, according to one or more embodiments. As shown in the example of FIG. 7, the actors include an in-guest data protection agent 705, socket library 710 (e.g, vSocket), snapshot data mover 715, and virtual machine manager 720 (e.g., vCenter).

When the snapshot data mover receives a socket command originating from the in-guest data protection agent, the snapshot data mover authenticates the agent. In an embodiment, authentication includes symmetric key authentication. A symmetric key is one that is used both to encrypt and decrypt information. In this embodiment, when the in-guest agent initially seeks to establish a connection to the snapshot data mover, the agent forwards a symmetric key (or other value or identifier encrypted by the symmetric key) to the snapshot data mover. The snapshot data mover decrypts the key or encrypted other value and checks for a match to authenticate the agent.

The authentication of the in-guest data protection agent is performed before the triggering of the guest application and file system freeze windows (see, e.g., time windows 316 and 319, FIG. 3). That is, when the CommitSnapshots method is called, the connection between the in-guest data protection agent (or agent VSS provider) and the snapshot data mover will have already been established and existing so that no additional time is spent on the initial authentication during these time windows.

In an embodiment, a method includes receiving, at an in-guest data protection agent in a virtual machine, a command to conduct an application-consistent backup of an application executing in the virtual machine; and prior to requesting that a copy service prepare the application for snapshotting, establishing a communication channel with a snapshot data mover executing at a host-level of a host hosting the virtual machine.

FIG. 8 shows a flow for transparent snapshot-based file system consistent virtual machine protection. As discussed, transparent snapshots support only crash consistent backups. To support file system consistent protection, the in-guest data protection agent or, more particularly, agent VSS requestor component includes intelligence and logic to detect if a file system consistent protection is needed. If so, the agent VSS requestor freezes all the necessary writers on the system, including the system writers. The agent VSS requestor also checks if all the required writers are in a stable state. If some of the required writers are not in the proper state the agent VSS requester prompts the user to restart the corresponding services and retry generation of the snapshot.

In a step 810, an in-guest data protection agent receives a command to conduct a file system-consistent backup of a virtual machine. The virtual machine includes an application and a copy service having application and system writers. As discussed, the application writer is responsible for quiescing the application and the system writers are responsible for quiescing system state of the virtual machine. The command may be sent by the data protection management server based on a review of a backup policy that specifies a file system-consistent backup of the virtual machine.

In other words, backup options specifying file system-consistent, application-consistent, or crash-consistent is a policy configuration that may be set by the customer user. These policy configuration operations provide the customer user with flexibility in deciding how to protect the virtual machine. For example, in some cases, a virtual machine may be used to host a SQL Server installation having one or more large production databases that the user wishes to protect. Other disks connected to the virtual machine may not necessarily be of interest to the user to protect. In this case, the customer user can configure an application-consistent protection policy that selectively generates snapshots of the disks containing the databases while excluding snapshots of other disks connected to the virtual machine not containing the databases. This can speed the overall snapshot and rollover process as disks not requiring protection can be excluded from the backup workflow.

Alternatively, there can be other cases where the user wishes to protect the entire file system including various file sets and all the applications that may be running on the virtual machine. For example, the virtual machine may be running SQL Server, Exchange, Active Directory, or other applications and the user may wish to protect the entire virtual machine. In this scenario, the user can create a policy specifying a file system-consistent snapshot and file system-consistent snapshots will be generated of all disks attached to the virtual machine.

In a step 815, the data protection agent issues a first request to a copy service indicating that all files of the virtual machine are to be backed up and that archive attributes of all the files should remain unchanged, the first request thereby triggering the copy service to notify the application and system writers of a snapshot operation.

Indicating that the archive attribute is to remain unchanged helps to ensure that log files that may be created by certain applications, such as Microsoft Exchange, are not truncated. Indicating that the archive attribute is to remain unchanged preserves all the application files including log files on the production system. In an embodiment, indicating that the archive attribute is to remain unchanged includes the agent VSS requestor providing to the VSS copy service the backup type as VSS_BT_COPY rather than VSS_BT_FULL. In other words, the agent VSS requestor includes intelligence or logic to provide the backup type as VSS_BT_COPY instead of VSS_BT_FULL as may be used in the case of application-consistent protection. The remaining workflow is similar to that of the application consistent virtual machine protection.

In an embodiment, the data protection agent (e.g., agent VSS requestor) monitors or checks the status of each writer to determine a progress or status of the writer in regards to preparing its files for a snapshot backup. If the monitoring or checking indicates that a writer has timed out or has failed to respond with an indication that its files are ready for a snapshot to be taken, the data protection agent may retry the request, prompt a user to restart the problematic services, or both. In an embodiment, the data protection agent confirms that all writers are ready for snapshotting before making a snapshot request to the data manager. This helps to ensure that time, effort, and resources are not expended generating a snapshot that is not file system-consistent.

In an embodiment, a method includes instructing a first writer associated with a first application running in the virtual machine to prepare and place the first application in a state for backup; instructing a second writer associated with a second application running in the virtual machine to prepare and place the second application in a state for backup; checking that the first and second writers have prepared and placed their respective applications in a state for backup; and if any of the first or second writers have indicated that their respective applications are not in a proper state for backup, prompting a user to restart the respective application.

In a step 820, the data protection agent, upon confirming that all writers are in a stable state, issues a second request to a snapshot data mover for a snapshot of the virtual machine. Again, the snapshot data mover executes at a host-level of the host and is outside of or external to the virtual machine.

In a step 825, the snapshot data mover passes the snapshot request to a virtual machine manager managing the virtual machine. The virtual machine manager, upon receiving the snapshot request, then executes the operations required to generate the snapshot.

In a step 830, the snapshot data mover receives from the virtual machine manager an identifier identifying the snapshot.

In a step 835, the snapshot data mover passes the snapshot identifier to the data protection agent, thereby allowing the data protection agent to locate the snapshot and conduct the file system-consistent backup.

FIG. 9 shows a flow for intelligent snapshotting for virtual machines with heterogeneous disks (e.g., different disk types). The VMWare virtualization platform supports multiple types of disks such as a virtual machine disk (VMDK), raw device mapping (RDM) disk, and others.

Virtual machine disks may be formatted using the virtual machine file system (VMFS). Raw device mapping allows for presenting storage to a virtual machine as a Small Computer System Interface (SCSI) target. VMDK formatted disks, RDM formatted disks, and others can be attached to a virtual machine. VMDK disks may be mounted on a vSphere datastore and RDM disks may be directly mapped to a virtual machine from storage array. The VMWare virtualization platform does not support snapshots of RDM disks. Further, the virtualization platform lacks built-in snapshot support for heterogeneous disk types such as, for example, a VM attached VMDK as well as RDM disks at the same instance. This is a very common use case and can be seen in configurations involving SAP High-performance ANalytic Appliance (HANA) as provided by SAP of Germany.

Figure 10:
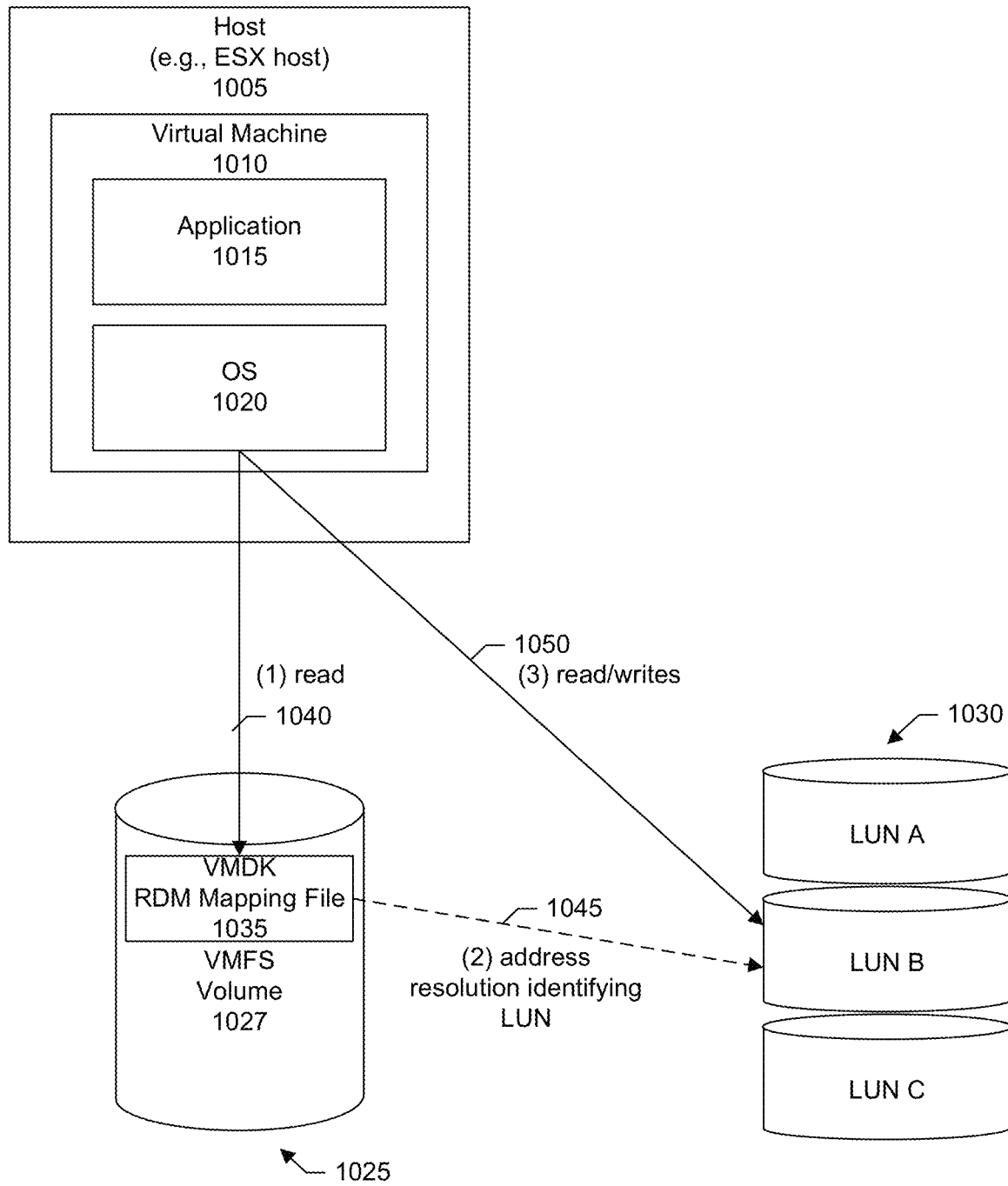
FIG. 10 shows a block diagram of a raw device mapping (RDM) storage configuration for a virtual machine, according to one or more embodiments.

FIG. 10 shows a block diagram of a virtual machine accessing an RDM disk. There is a host 1005 (e.g., ESX host) hosting a virtual machine 1010. The virtual machine includes as guests application 1015 and operating system 1020. There are physical LUNs 1025, 1030. Physical LUN 1025 includes a virtual machine file system (VMFS) volume 1027. Physical LUN 1030 may be on a storage area network (SAN).

Raw device mapping allows a virtual machine to access a LUN directly and without having to use the virtual machine file system (VMFS). In other words, raw device mapping allows remote physical LUNs to be directly exposed to the virtual machine. The LUNs can be formatted as, for example, a Microsoft Windows New Technology File System (NTFS) or other file system format, different from the VMFS file system format. Applications configured with RDM disks can directly read and write to the physical storage. RDM disks can, under certain circumstances, offer advantages over virtual machine disks such as increased performance for large scale applications.

In particular, RDM includes a mapping file 1035 in a separate VMFS volume that acts as a proxy for a raw physical storage device. The mapping file, not the raw LUN, is referenced in the virtual machine configuration. With the RDM, a virtual machine can access and use the storage device directly. The RDM contains metadata for managing and redirecting disk access to the physical device. Specifically, when LUN 1025 is opened for access by the virtual machine, the mapping file is read 1040 to obtain the reference or pointer 1045 to the raw LUN. Afterwards, reads and writes 1050 proceed directly to the raw LUN rather than passing through the mapping file and the VMFS volume.

In an embodiment, systems and techniques intelligently discover the types of disks attached to the virtual machine and categorizes them as per the type. Snapshot requests are then triggered to multiple destinations in parallel during the same snapshot freeze time window. For example, if a virtual machine has two disks including one VMDK disk with LWD support and another RDM disk on PowerStore device (or other storage system), the data protection agent intelligently discovers that configuration prior to snapshot operation and during the protection workflow triggers a snapshot request to the snapshot data mover (e.g., over vSocket) and to the PowerStore management interface over a Transmission Control Protocol (TCP) network. The agent then consolidates the responses from all the snapshot request interfaces and determines the overall status for the snapshot operation of that virtual machine.

Referring now to FIG. 9, in a step 910, the in-guest data protection agent receives a command to conduct an application-consistent backup of the virtual machine. In a step 915, the data protection agent initiates a discovery of disk types attached to the virtual machine. The discovery may include, for example, communicating with the guest application to be protected and guest OS in order to discover the disk or disk types used by the application. As discussed, the data protection agent is able to communicate with the guest application and guest OS via APIs that each may expose because the agent is installed alongside the application in the same virtual machine. The agent may review the RDM mapping file to obtain an identifier associated with storage array LUN.

In a step 920, based on the discovery, a first disk attached to the virtual machine is identified as being a virtual machine disk (or VMDK formatted disk); and a second disk attached to the virtual machine is identified as being a raw device mapping disk (or RDM formatted disk). The identifications of disk types and disks attached to the virtual machine may be stored in a table or other competent data structure. The table may include, for example, identifications of the virtual machine disk and LUN identifier of the RDM disk.

In a step 925, after the discovery and identification of the attached disk types has been made, a request is issued, via the copy service, that a writer associated with the application prepare the application for a snapshot operation, the request thereby triggering a time window within which the application will be frozen.

In a step 930, a first request is issued, over a socket communication channel, to the snapshot data mover for a snapshot of the VMDK.

In a step 935, a second request is issued, in parallel with the first request and over a TCP network, for a snapshot of the RDM disk to a controller of a storage array responsible for presenting the second disk to the virtual machine. In particular, once the agent has obtained the identifier to the storage array mapped by the RDM mapping file, the agent issues the second request directly to the storage array and bypasses the VMFS volume. The second request bypasses the VMFS storage management interface and is sent directly to the LUN storage device. In other words, the snapshot request may be sent directly an external storage device having the LUN and without passing through the snapshot data mover. As discussed, the LUN need not be formatted using the virtual machine file system. The LUN may be formatted using any file system, such as New Technology File System (NTFS). The LUN may be addressed using SCSI commands. The snapshot requests to the different disks and storages are issued during the same time window within which the application is frozen. This helps to ensure that each snapshot corresponds to the same point in time.

In a step 940, responses to the first and second snapshot responses are managed to conduct the backup. For example, the agent may track and record the location or identifier of a first snapshot generated in response to the first snapshot request. The agent may track and record the location or identifier of a second snapshot generated in response to the second snapshot request. If, for example, one or more snapshot requests timeout or an error is returned, the snapshot operation may be indicated to the copy service, data protection management server, virtual machine manager, or combinations of these as having encountered an error and failed. Notifying entities such as the copy service and data protection manager of the error helps to ensure that the entities will not mark and catalog a backup as having been completed. If the data protection agent determines that an error has occurred with at least one of the snapshot requests, the data protection agent aborts and retries the entire snapshot operation. For example, the data protection agent may resend each of the first and second snapshot requests.

The flow example shown in FIG. 9 included a virtual machine with two heterogeneous or different disk types. It should be appreciated, however, that a virtual machine may have any number of heterogeneous or different disk types. For example, a virtual machine may include two virtual machine disks and two RDM disks; one virtual machine disk and three RDM disks; and so forth. The in-guest agent discovers, at run time, the types of disks that are attached to the virtual machine. The agent then issues concurrent and multiple snapshot requests over the different interfaces accordingly and manages the responses.

In an embodiment, a method includes determining that an error has occurred with at least one of generating a first snapshot in response to the first snapshot request or generating a second snapshot in response to the second snapshot request; and based on the determination, notifying the copy service of the error.

In another embodiment, a method includes receiving, in response to the first request, an identifier of a first snapshot for the VMDK disk; not receiving, in response to the second request, an identifier of a second snapshot for the RDM disk; determining that the backup failed; and retrying the backup.

In another embodiment, a method includes not receiving, in response to the first request, an identifier of a first snapshot for the VMDK disk; receiving, in response to the second request, an identifier of a second snapshot for the RDM disk; determining that the backup failed; and retrying the backup.

The time window prescribed by the copy service for generating the snapshots may likewise be manipulated as shown in FIG. 5 and described in the accompanying discussion to artfully extend the time available to generate the snapshots. For example, in an embodiment, the 10-second flush and hold window (time window 319, FIG. 3) may lapse before a successful indication of snapshot generation is received responsive to the first snapshot request, second snapshot request, or both. Prior to the lapse of the flush and hold window, however, the data protection agent indicates a successful snapshot generation and delays in the PostCommitSnapshots method to provide additional time for snapshot generation of the VMDK disk, RDM disk, or both.

Figure 11:
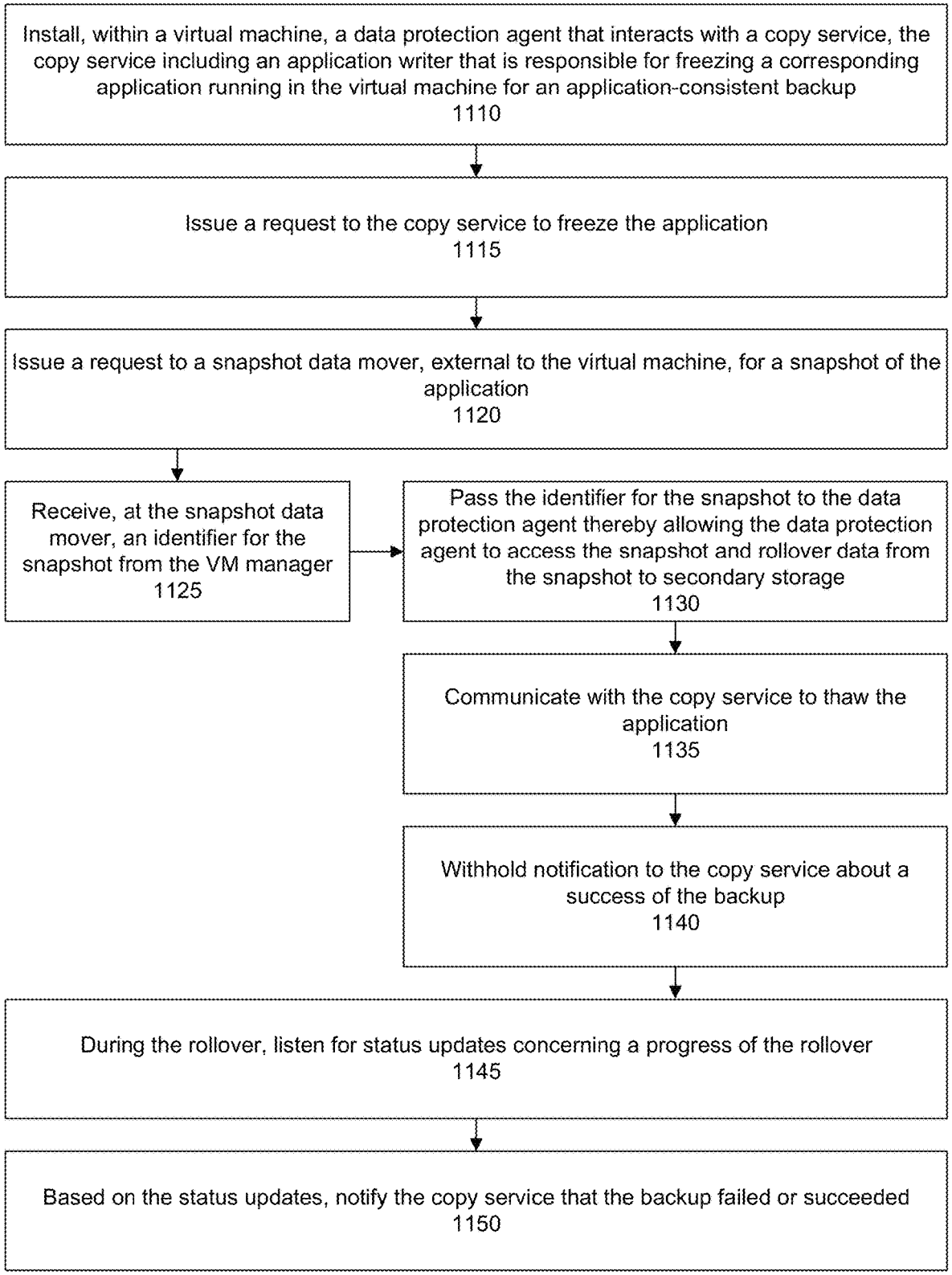
FIG. 11 shows a flow for avoiding unwanted log truncation or data loss during an application-consistent virtual machine snapshot, according to one or more embodiments.

FIG. 11 shows a flow for avoiding unwanted log truncation (data loss) during an application-consistent virtual machine snapshot. It has been observed that previous approaches utilizing the VADP snapshot technique had the potential for data corruption or loss. In particular, VMware Tools, acting as a VSS requestor, calls a backup as complete or successful without having verified that the rollover from the snapshot had, in fact, succeeded.

For example, referring now to FIG. 3, table H below shows the steps followed by the VADP workflow.

TABLE H

| Step | Description |
|---|---|
| 1 | vProxy takes a VADP snapshot using the vSphere API CreateSnapshotEx_Task. Internally this involves VMTools as a VSS requestor taking the snapshot. It will call the |

TABLE H-continued

| Step | Description |
|---|---|
| | BackupComplete with success and also will call SetBackupSucceeded for each VSS component involved in the snapshot. |
| 2 | vProxy performs the data movement or roll over to secondary storage (e.g., Data Domain appliance). |
| 3 | vProxy creates a catalog for this backup. |
| 4 | vProxy calls MS agent running inside the guest to perform the application cataloging. |

Consider, as an example, that if the any of step 2,3, or 4 fails the VSS copy service will be unaware of the failure. The application catalog, e.g., SQL backup table, will have an entry for this backup. But, the secondary storage system (e.g., Data Domain) will not have the data corresponding to this backup to perform the restorations.

Thus, the following problems can arise: 1) Application catalog will have an entry for a backup which does not exist on the secondary storage; 2) While taking the subsequent log backups, the backup application may mistakenly refer to the above entry; and 3) For some applications, such as Microsoft Exchange, a VSS full backup results in log truncation so there will eventually be data loss.

In an embodiment, the in-guest data protection agent includes an agent VSS requestor that withholds notification to the copy service about a completed backup until the rollover from the snapshot has been completed. More particularly, in a step 1110, installed within a virtual machine is an in-guest data protection agent that interacts with a copy service, the copy service including an application writer that is responsible for freezing a corresponding application running in the virtual machine for an application-consistent backup. As discussed, in an embodiment, the in-guest data protection agent includes an agent VSS requestor and an agent VSS provider. The agent VSS requestor serves as the requestor communication component or endpoint to the copy service; and the agent VSS provider serves as the provider communication component or endpoint to the copy service.

In a step 1115, a request is issued, by the agent VSS requestor, to the copy service to freeze the application.

In a step 1120, a request is issued, by the agent VSS provider, to a snapshot data mover, external to the virtual machine, for a snapshot of the application.

In a step 1125, an identifier for the snapshot is received at the snapshot data mover from the virtual machine manager. The receipt of the snapshot identifier indicates that snapshot generation has been successful and triggers several events including the passing of the snapshot identifier from the snapshot data manager to the data protection agent or, more particularly, the agent VSS provider. This allows the data protection agent or, more particularly, vProxy agent, to locate the snapshot and conduct the rollover or sync operation of the snapshot to secondary storage (step 1130) with the data protection manager. The copy service is also notified of the snapshot generation so that the application can be thawed (step 1135).

In a step 1140, however, notification to the copy service about a success of the backup from the agent VSS requestor is withheld. That is, a backup complete method 340 (FIG. 3) is not yet called by the agent VSS requestor despite having received the snapshot identifier indicating a successful snapshot generation. Instead, during the rollover, the agent VSS requestor of the data protection agent waits and listens for status updates from the data protection manager (e.g., vProxy agent) or snapshot data mover (in the case of an light weight delta filter configuration) concerning a progress of the rollover (step 1145). In a step 1150, based on the status updates, the copy service is notified that either the backup succeeded or the backup failed.

The BackupComplete method causes the VSS copy service to generate a BackupComplete event, which signals writers that the backup process has completed. In an embodiment, the agent VSS requestor includes logic on when to call the BackupComplete method. The BackupComplete method is not called until the rollover has successfully completed or there is a determination that the rollover has failed (in which case the agent VSS requestor passes a value to the copy service indicating that the backup complete is false).

In an embodiment, a protocol is provided for the sync progress of the rollover operation. Specifically, while the data protection manager (e.g., vProxy) is conducting the data movement as described in the step 2 of the workflow shown in table H above, the data protection manager sends a sync progress message (similar to a heartbeat) to the agent VSS requestor. The progress messages indicate to the agent VSS requestor that the data movement is still in progress. Now there can be the following two cases:

In a first case, sync progress messages are not received over a period of time as expected by the agent VSS requestor. In this case, the agent VSS requestor wait times out. In this scenario, the agent VSS requestor sets BackupComplete as false and also sets SetBackupSucceeded as false for all the VSS components so that the VSS copy service is aware that the backup has failed. The data protection manager (e.g., vProxy) can retry the backup at a later time. More particularly, in an embodiment, a method may include during the rollover, not receiving the status updates for a predefined period of time; determining that the backup has failed; and setting a flag in a call to an application programming interface (API) exposed by the copy service that indicates the backup as being complete to be false. The predefined period of time may be configured to be 3 minutes, but can be set to any threshold duration. In another embodiment, a method may include during the rollover, receiving a status update indicating that the rollover has failed; and setting a flag in a call to an application programming interface (API) exposed by the copy service that indicates the backup as being complete to be false.

In a second case, the data transfer is completed successfully and an indication is received of the data protection manager having called the Microsoft agent to conduct the application cataloging (step 4, table H). In this case, the agent VSS requestor sets SetBackupSucceeded as true and calls BackupComplete with true. The VSS copy service can then proceed to instruct the corresponding application to create a record of this backup. More particularly, in an embodiment, a method may include during the rollover, receiving a status update indicating that the rollover has completed; and setting a flag in a call to an application programming interface (API) exposed by the copy service that indicates the backup as being complete to be true.

FIG. 12 shows a flow for excluding an unsupported disk (e.g., dynamic, raw, shared) during an application consistent backup, according to one or more embodiments. A virtualization platform may support different types of disks. For example, dynamic disks refer to disks which can grow as the data within the virtual disk grows. As discussed, raw device mapping (RDM) allows a virtual machine to connect directly to a storage logical unit number (LUN) on the storage area network. A shared virtual disk is a VMDK file that two or more virtual machines can read and write at the same time. Some environments within which protection is desired, however, may include storage systems, applications, or other configurations in which certain types of disks are not supported. It has been observed that previous approaches utilizing the VADP snapshot workflow technique were unable to exclude certain disks from the snapshot because the data protection management server (e.g., vProxy) was not able to determine on what VMDK disks application data resided because VMware Tools, in acting as the VSS provider, did not provide such details.

In an embodiment, a data protection system includes a data protection manager, in-guest data protection agent, and host-level snapshot data mover that communicate and coordinate among each other to gather disk and other configuration details in order to identify which disks should be included in a snapshot and which disks should not be included in the snapshot. In particular, the data protection agent includes an agent VSS provider and agent VSS requestor running within the virtual machine for which a snapshot is to be created. The data protection agent, by virtue of running inside the virtual machine, has visibility into the location of the application databases and directory structure used by the guest application and operating system.

The in-guest agent determines, based on an interrogation of the application, operating system, or both, the disks attached to the virtual machine and containing the application databases or other data for which application-consistent protection is sought. The agent formats and passes the information in a snapshot request to the snapshot data mover. Disks not needing protection are omitted or excluded from the request. The snapshot data mover, in turn, calls the virtualization platform API with the snapshot request, the request excluding the disks not needed for the application-consistent backup.

More particularly, the guest Windows operating system understands the virtual machine disks as volumes that are attached to the virtual machine. In an embodiment, a technique includes mapping volumes to the virtual machine disks to which they belong. The technique includes reviewing the virtual machine settings to identify the associated SCSI controller, identifying from within the virtual machine the target identifier and bus number. The Windows disk management utility is accessed to obtain the location, bus number, target identifier, and LUN information. A map is created between this information and the SCSI controller information which then allows a mapping of the virtual machine disks to the volumes that are attached in the guest Windows OS. Information identifying the virtual machine disks to include in the snapshot are sent by the in-guest agent to the snapshot data mover. Virtual machine disks that should not be included in the snapshot are omitted from the snapshot request. The determination or identification of the virtual machine disks to be included in the snapshot is made before the triggering of the copy service time windows (e.g., before the 10-second flush and hold window starts). This helps to make good use of the time available for creating the snapshot.

Referring now to FIG. 12, in a step 1210, the data protection agent is installed as a guest within the virtual machine. As discussed, the data protection agent includes an agent VSS provider and agent VSS requestor to interact with a copy service of the virtual machine. The agent VSS requestor identifies which virtual machine disk or VMDK corresponds to which disks attached to the Windows operating system of the virtual machine. The identification is accomplished, at least in part, by the data protection manager (e.g., vProxy) passing disk configuration details with the snapshot request to the agent VSS requestor. In an embodiment, the in-guest agent probes the guest application, operating system or both during runtime to identify which virtual machine disks attached to the virtual machine contain the application databases.

Figure 13:
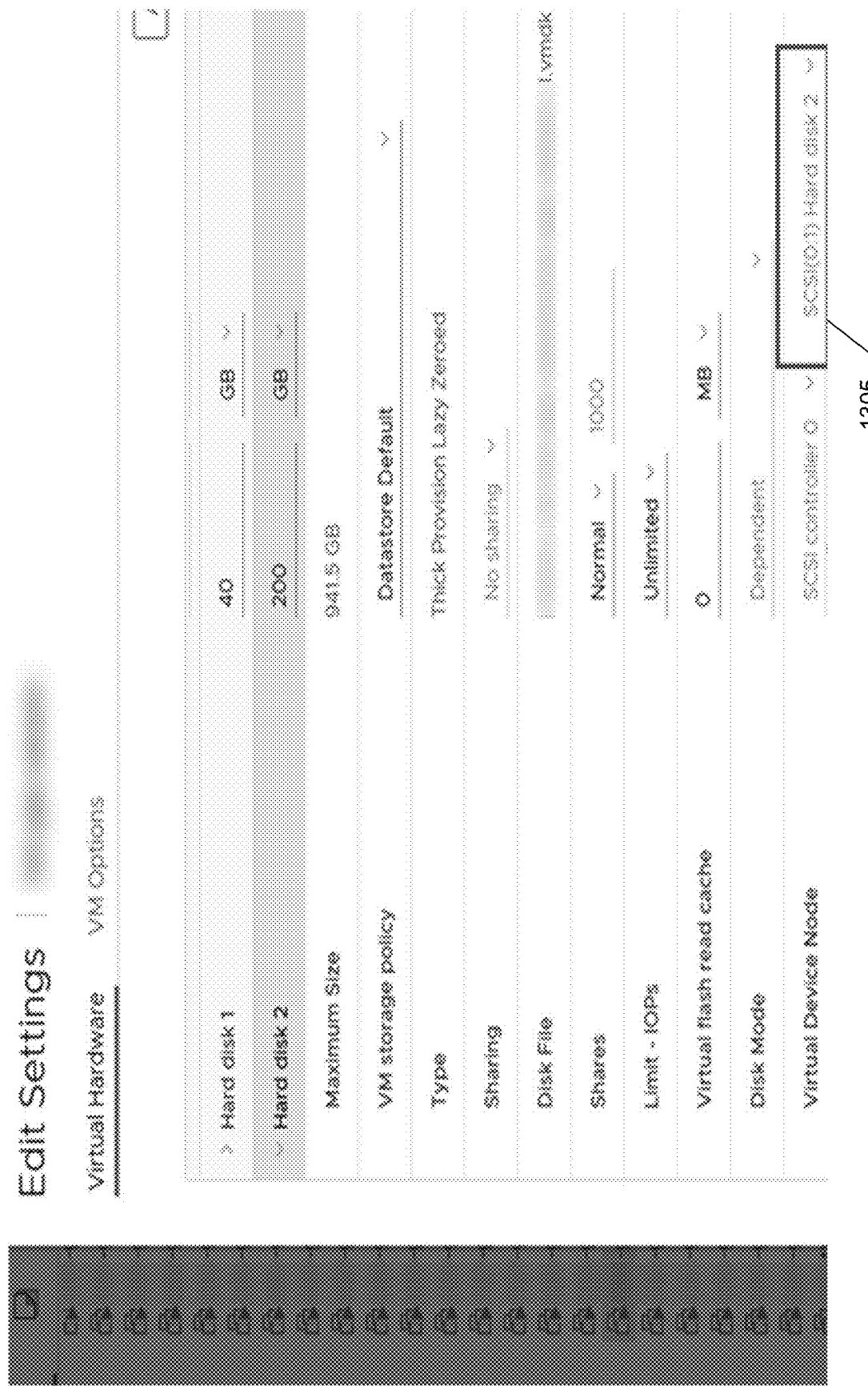
FIG. 13 shows a screenshot of virtual hardware settings, according to one or more embodiments.

That is, in a step 1215, the data protection agent receives a request from the data protection manager to perform an application-consistent snapshot backup, the request including identifications of virtual machine disks (VMDKs) associated with the virtual machine. More particularly, in an embodiment, the data protection manger (e.g., vProxy) passes the VMDK disk universally unique identifier (uuids) as part of the snapshot request to the agent VSS requestor. FIG. 13 shows a screenshot of virtual hardware settings associated with the virtual machine. In an embodiment, the data protection manager may further pass some other information such as the SCCI controller's bus number and target ID as shown in FIG. 13. Virtual device node 1305 specifies which SCSI or IDE device identifier to use for the drive. For example, the selected value SCSI 0:1 indicates the guest operating system seeing the drive as ID 1 on controller 0.

In a step 1220 (FIG. 12), the agent communicates with a disk manager of a guest operating system of the virtual machine to generate a map mapping the virtual machine disks to volumes that are attached to the virtual machine. In a step 1225, the agent communicates with the application to identify which of the volumes contain application databases associated with the application.

Figure 14:
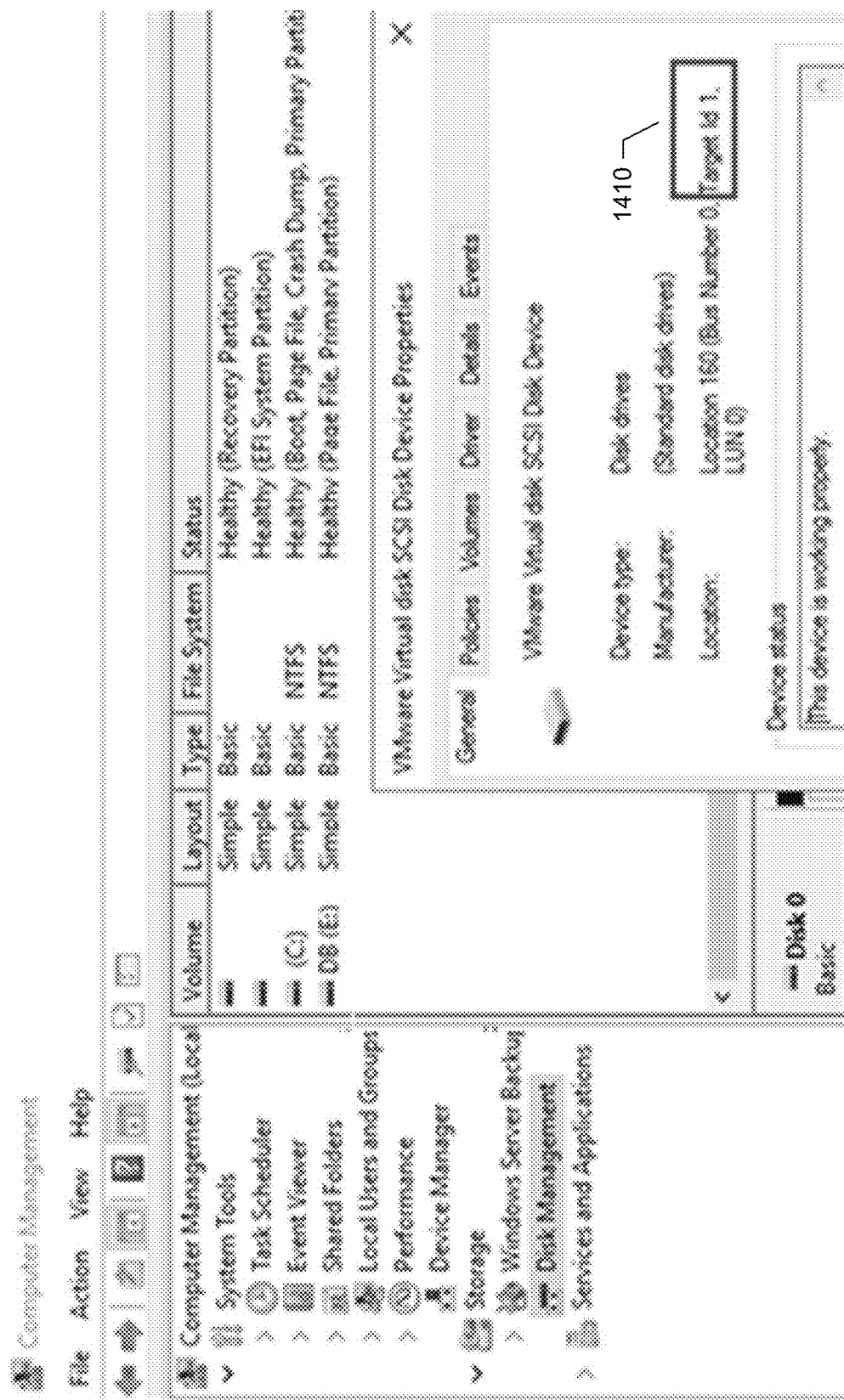
FIG. 14 shows a screenshot of virtual device properties, according to one or more embodiments.

FIG. 14 shows a screenshot of virtual disk SCSI disk device properties and location details 1410. More particularly, the in-guest agent VSS requestor checks with the application configured for the protection to identify the disks on which the application data resides and thus should be included in the VSS snapshot operation. The in-guest agent VSS requestor then uses the Windows APIs to obtain the location of the disks required for the snapshot and then uses the gathered information to determine what disks can be excluded from the snapshot.

Referring back now to FIG. 12, in a step 1230, the agent VSS requestor notifies the copy service to prepare the application for the application-consistent backup. In a step 1235, the agent VSS provider issues a request to the snapshot data mover for a snapshot of the application. The request includes identifications of a subset of the VMDKs mapped to corresponding volumes that contain the application databases. VMDKs mapped to corresponding volumes not containing the application databases are excluded or omitted from the request. The agent VSS requestor creates the SDM snapshot request accordingly to include only the required disks. FIG. 15 shows an example of a snapshot request that the agent VSS provider may send to the snapshot data mover in which only required disks 1510 are identified.

The technique shown in FIG. 12 and described in the accompanying discussion overcomes a major limitation with the VADP snapshots and allows supporting many use cases including: 1) Supporting VMs having raw disks while the application data is on other normal disks (e.g., VMDKs); and 2) supporting VMs having corrupted/encrypted disks so long as the application data resides on the normal disks.

As an example, consider that there are 10 virtual machine disks attached to the virtual machine, but databases reside on only 4 of the virtual machine disks. The technique shown in FIG. 12 allows for identifying the 4 disks containing the databases and taking snapshots of those 4 disks while excluding the remaining 6 virtual machine disks.

In an embodiment, systems and methods are provided for transparent snapshot-based application consistent virtual machine protection. In this embodiment, a method includes installing a data protection agent as a guest within a virtual machine hosted on a host, the virtual machine comprising an application and a copy service having a writer responsible for quiescing the application for an application-consistent backup; installing, on the host, a snapshot data mover external to the virtual machine; upon receiving, at the data protection agent, a command to conduct the backup, issuing, from the data protection agent, a first request to the copy service indicating that the application is to be backed up; and issuing, from the data protection agent, a second request to the snapshot data mover for a snapshot of the application; passing, by the snapshot data mover, the request for the snapshot to a virtual machine manager; receiving, at the snapshot data mover from the virtual machine manager, an identifier identifying the snapshot; and passing the snapshot identifier to the data protection agent thereby allowing the data protection agent to locate the snapshot and conduct the application-consistent backup.

The method may include: before passing the request for the snapshot to the virtual machine manager, validating, by the snapshot data mover, the snapshot request from the data protection agent. In an embodiment, the copy service comprises a volume shadow copy service (VSS). In an embodiment, the data protection agent is blocked from initiating communication with the virtual machine manager.

The method may include manipulating time windows prescribed by the copy service during which the application, file system of the virtual machine, or both are frozen. The method may include: before issuing the request for the snapshot of the application to the snapshot data mover, checking that the application is frozen.

In another embodiment, systems and techniques provide an intelligent snapshot process for virtual machines with heterogeneous disks. In this embodiment, a method includes: receiving, at a data protection agent, a command to conduct a backup of a virtual machine, the virtual machine comprising a copy service having writers responsible for quiescing applications running in the virtual machine; initiating a discovery of disk types attached to the virtual machine; based on the discovery, identifying a first disk attached to the virtual machine as being a virtual machine disk (VMDK) formatted disk, and a second disk attached to the virtual machine as being a raw device mapping (RDM) formatted disk; after the discovery and identification, requesting, via the copy service, that the writers prepare the applications for a snapshot operation, the request thereby triggering a time window within which the applications will be frozen; issuing, over a socket communication channel, a first request for a snapshot of the VMDK formatted disk to a snapshot data mover running on the host and outside of the virtual machine; issuing, in conjunction with the first request and over a Transmission Control Protocol (TCP) network, a second request for a snapshot of the RDM formatted disk to a controller of a storage array responsible for presenting the second disk to the virtual machine; and managing responses to the first and second snapshot requests to conduct the backup.

In an embodiment, the first and second requests are issued during the same time window within which the applications will be frozen. The method may include: manipulating the time window within which the applications will be frozen for a first snapshot to be generated responsive to the first request and a second snapshot to be generated responsive to the second request.

In an embodiment, managing responses to the first and second snapshot requests comprises: determining that an error has occurred with at least one of generating a first snapshot in response to the first snapshot request or generating a second snapshot in response to the second snapshot request; and based on the determination, notifying the copy service of the error.

The method may include: receiving, in response to the first request, an identifier of a first snapshot for the VMDK disk; not receiving, in response to the second request, an identifier of a second snapshot for the RDM disk; determining that the backup failed; and retrying the backup.

The method may include: not receiving, in response to the first request, an identifier of a first snapshot for the VMDK disk; receiving, in response to the second request, an identifier of a second snapshot for the RDM disk; determining that the backup failed; and retrying the backup.

In another embodiment, systems and techniques provide an intelligent application writer type-based extension for Microsoft VSS timeout. In this embodiment, a method includes: issuing a first request to a copy service of a virtual machine to indicate that an application running in the virtual machine is to be backed up, the first request thereby triggering a first time window within which the application will be frozen and a second time window, inside the first time window, within which a file system of the virtual machine will also be frozen; issuing, in conjunction with the first request, a second request to a snapshot data mover for a snapshot of the application; coordinating with a virtual machine manager of the virtual machine to generate the snapshot; not receiving within the second time window an indication that generation of the snapshot has been successful; prior to expiration of the second time window, notifying the copy service that generation of the snapshot has been successful despite the not receiving within the second time window the indication; in response to the notifying, receiving a call from the copy service indicating that a cleanup operation on the snapshot can proceed, the call thereby indicating that the file system has been thawed; and delaying returning the call from the copy service until one or more of a plurality of events have occurred, wherein a first event comprises the first time window about to expire, and a second event comprises receiving a confirmation from the snapshot data mover that the snapshot has been successfully generated.

The method may include identifying the application; and based on the identification of the application, determining a length of the delay that is available. In an embodiment, the copy service comprises a volume shadow copy service (VSS).

In an embodiment, the call from the copy service indicating that the file system has been thawed comprises receiving from the copy service a notification that cleanup work associated with generating the snapshot can proceed.

In an embodiment, the method includes: when the first time window is about to expire and confirmation of successful snapshot generation has not been received, returning to the copy service an indication that an unexpected provider error has occurred, thereby causing the copy service to fail the snapshot generation process. In an embodiment, the method includes: when confirmation of successful snapshot generation has been received before expiration of the first time window, returning to the copy service an indication that the cleanup operation has been successful.

In another embodiment, systems and techniques are provided for achieving TSDM-based application-consistent snapshots by enabling secure vSocket communication in the absence of network connectivity between the in-guest agent and vCenter. In this embodiment, a method includes: receiving at a data protection agent a command to conduct an application-consistent backup of an application, the data protection agent and the application being installed as guests in a virtual machine provided by a hypervisor of a host, the virtual machine being connected to a virtual machine guest network and the hypervisor being connected to an infrastructure network, separate from the virtual machine guest network; establishing a socket communication channel between the data protection agent and a snapshot data mover running on the host and outside of the virtual machine; issuing, from the data protection agent to the snapshot data mover, a request over the socket communication channel for a snapshot of the application; and passing the request for the snapshot to a virtual machine manager connected to the infrastructure network.

Establishing a socket communication channel may include receiving, at the snapshot data mover, a connection request from the virtual machine; and validating the connection request. In an embodiment, the socket communication channel is established before issuance of a request to freeze the application for snapshotting. In an embodiment, the method includes: after the establishing the socket communication channel between the data protection agent and the snapshot data mover, notifying a copy service to prepare the application for snapshotting, the notification thereby triggering a start of a time window within which the application is to be frozen. In an embodiment, the virtual machine guest network is isolated from the infrastructure network. The virtual machine may be blocked from issuing communications to the virtual machine manager.

In another embodiment, systems and techniques are provided for transparent snapshot-based file system consistent virtual machine protection. In this embodiment, a method includes: receiving at a data protection agent a command to conduct a file system-consistent backup of a virtual machine, the virtual machine comprising a plurality of applications and a copy service having a plurality of application writers and a plurality of system writers, the application writers being responsible for quiescing the applications, and the system writers being responsible for quiescing system state of the virtual machine; issuing, from the data protection agent, a first request to the copy service indicating that all files of the virtual machine are to be backed up and that archive attributes of all the files should remain unchanged, the first request thereby triggering the copy service to notify the application writers and system writers of a snapshot operation; issuing, from the data protection agent, a second request to a snapshot data mover for a snapshot of the virtual machine, the snapshot data mover executing on the host and outside of the virtual machine; passing the request for the snapshot from the snapshot data mover to a virtual machine manager; receiving, at the snapshot data mover, an identifier identifying the snapshot from the virtual machine manager; and passing the snapshot identifier to the data protection agent to allow the data protection agent to locate the snapshot and conduct the backup.

The indication that archive attributes of all the files should remain unchanged thereby prevents application logs from being truncated. In an embodiment, the copy service comprises a volume shadow copy service (VSS) and the issuing the first request to the copy service comprises passing a value of "VSS_BT_COPY" to the copy service.

Issuing a first request to the copy service may include: instructing a first writer associated with a first application running in the virtual machine to prepare and place the first application in a state for backup; instructing a second writer associated with a second application running in the virtual machine to prepare and place the second application in a state for backup; checking that the first and second writers have prepared and placed their respective applications in a state for backup; and if any of the first or second writers have indicated that their respective applications are not in a proper state for backup, prompting a user to restart the respective application.

In an embodiment, the data protection agent is installed as a guest within the virtual machine. In an embodiment, the data protection agent comprises a requestor and a provider, wherein the requestor is responsible for interfacing with the copy service to make the snapshot request and the provider is responsible for interfacing with the copy service to provide the identifier for the snapshot.

In another embodiment, systems and techniques provide for avoiding unwanted log truncation (data loss) during the application consistent virtual machine snapshot. In an embodiment, a method includes: installing, within a virtual machine, a data protection agent comprising a requestor that interacts with a copy service, the copy service comprising an application writer that is responsible for freezing a corresponding application running in the virtual machine for an application-consistent backup; issuing, from the requestor, a request to the copy service to freeze the application; issuing a request to a snapshot data mover, external to the virtual machine, for a snapshot of the application; upon receiving an identifier for the snapshot from the snapshot data mover, communicating with the copy service to thaw the application; passing the identifier for the snapshot to the data protection agent thereby allowing the data protection agent to access the snapshot and rollover data from the snapshot to a secondary storage for the backup; and withholding notification to the copy service about a success of the backup; during the rollover, listening for status updates concerning a progress of the rollover; and based on the status updates, notifying the copy service that the backup failed or succeeded.

In an embodiment, the copy service comprises a volume shadow copy service (VSS) and the withholding notification to the copy service about a success of the backup comprises: not calling a BackupComplete method as provided by the VSS copy service until the rollover is complete. In an embodiment, the method includes: during the rollover, not receiving the status updates for a predefined period of time; determining that the backup has failed; and setting a flag in a call to an application programming interface (API) exposed by the copy service that indicates the backup as being complete to be false.

The method may include: during the rollover, receiving a status update indicating that the rollover has failed; and setting a flag in a call to an application programming interface (API) exposed by the copy service that indicates the backup as being complete to be false. The method may include: during the rollover, receiving a status update indicating that the rollover has completed; and setting a flag in a call to an application programming interface (API) exposed by the copy service that indicates the backup as being complete to be true. The method may include: while the application is frozen, manipulating the copy service to extend a time available for generating the snapshot.

In another embodiment, systems and techniques are provided to exclude the unsupported disk (e.g., dynamic, raw, or shared disk) during the application consistent backups. In this embodiment, a method for excluding disks from an application-consistent backup of an application in a virtual machine includes: installing, within the virtual machine, a data protection agent to interact with a copy service of the virtual machine, the copy service comprising a writer that is responsible for freezing the application; receiving a request to perform the backup, the request including identifications of virtual machine disks (VMDKs) associated with the virtual machine; communicating with a disk manager of a guest operating system of the virtual machine to generate a map that maps the VMDKs to volumes that are attached to the virtual machine; communicating with the application to identify which of the volumes contain application databases associated with the application; notifying the copy service to prepare the application for the backup; and issuing a request to a snapshot data mover for a snapshot of the application, wherein the request comprises identifications of a subset of the VMDKs mapped to corresponding volumes that contain the application databases, and wherein VMDKs mapped to corresponding volumes not containing the application databases are excluded from the request.

In an embodiment, the identifications of the subset of the VMDKs mapped to corresponding volumes that contain the application databases are made before the notification to the copy service to prepare the application for the backup. Notifying the copy service to prepare the application for the backup triggers a time window during which the application will be frozen. In an embodiment, the method includes: while the application is frozen, manipulating the copy service to extend a period of time available for generating the snapshot. In an embodiment, the snapshot data mover is installed at a host-level of a host hosting the virtual machine.

Figure 16:
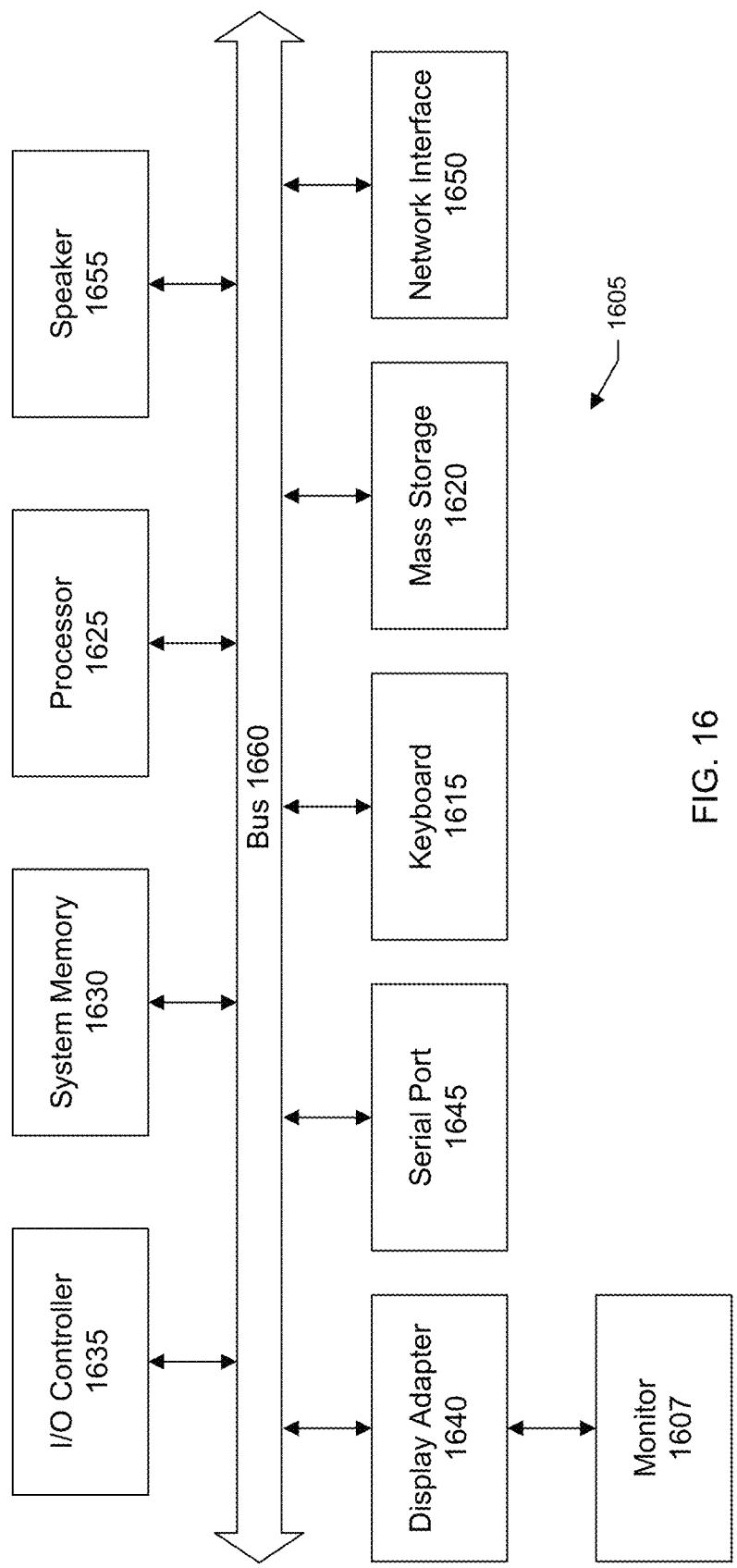
FIG. 16 shows a block diagram of a computer system suitable for use with the system, according to one or more embodiments.

FIG. 16 shows a system block diagram of a computer system 1605 used to execute the software of the present system described herein. The computer system includes a monitor 1607, keyboard 1615, and mass storage devices 1620. Computer system 1605 further includes subsystems such as central processor 1625, system memory 1630, input/output (I/O) controller 1635, display adapter 1640, serial or universal serial bus (USB) port 1645, network interface 1650, and speaker 1655. The system may also be used with computer systems with additional or fewer subsystems. For example, a computer system could include more than one processor 1625 (i.e., a multiprocessor system) or a system may include a cache memory.

Arrows such as 1660 represent the system bus architecture of computer system 1605. However, these arrows are illustrative of any interconnection scheme serving to link the subsystems. For example, speaker 1655 could be connected to the other subsystems through a port or have an internal direct connection to central processor 1625. The processor may include multiple processors or a multicore processor, which may permit parallel processing of information. Computer system 1605 shown in FIG. 16 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers. The variable N and other similar index variables are assumed to be arbitrary positive integers greater than or equal to two.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:
1. A method comprising:
receiving at a data protection agent a command to conduct a file system-consistent backup of a virtual machine, the virtual machine comprising a plurality of applications and a copy service having a plurality of application writers and a plurality of system writers, the application writers being responsible for quiescing the applications, and the system writers being responsible for quiescing system state of the virtual machine;
issuing, from the data protection agent, a first request to the copy service indicating that all files of the virtual machine are to be backed up and that archive attributes of all the files should remain unchanged, the first request thereby triggering the copy service to notify the application writers and system writers of a snapshot operation;

issuing, from the data protection agent, a second request to a snapshot data mover for a snapshot of the virtual machine, the snapshot data mover executing on the host and outside of the virtual machine;

passing the request for the snapshot from the snapshot data mover to a virtual machine manager;

receiving, at the snapshot data mover, an identifier identifying the snapshot from the virtual machine manager; and passing the snapshot identifier to the data protection agent to allow the data protection agent to locate the snapshot and conduct the backup.

2. The method of claim 1 wherein the indication that archive attributes of all the files should remain unchanged thereby prevents application logs from being truncated.

3. The method of claim 1 wherein the copy service comprises a volume shadow copy service (VSS) and the issuing the first request to the copy service comprises passing a value of "VSS_BT_COPY" to the copy service.

4. The method of claim 1 wherein the issuing a first request to the copy service further comprises:
instructing a first writer associated with a first application running in the virtual machine to prepare and place the first application in a state for backup;
instructing a second writer associated with a second application running in the virtual machine to prepare and place the second application in a state for backup;
checking that the first and second writers have prepared and placed their respective applications in a state for backup; and
if any of the first or second writers have indicated that their respective applications are not in a proper state for backup, prompting a user to restart the respective application.

5. The method of claim 1 wherein the data protection agent is installed as a guest within the virtual machine.

6. The method of claim 1 wherein the data protection agent comprises a requestor and a provider, wherein the requestor is responsible for interfacing with the copy service to make the snapshot request and the provider is responsible for interfacing with the copy service to provide the identifier for the snapshot.

7. A system comprising: a processor; and memory configured to store one or more sequences of instructions which, when executed by the processor, cause the processor to carry out the steps of:
receiving at a data protection agent a command to conduct a file system-consistent backup of a virtual machine, the virtual machine comprising a plurality of applications and a copy service having a plurality of application writers and a plurality of system writers, the application writers being responsible for quiescing the applications, and the system writers being responsible for quiescing system state of the virtual machine;
issuing, from the data protection agent, a first request to the copy service indicating that all files of the virtual machine are to be backed up and that archive attributes of all the files should remain unchanged, the first request thereby triggering the copy service to notify the application writers and system writers of a snapshot operation;
issuing, from the data protection agent, a second request to a snapshot data mover for a snapshot of the virtual machine, the snapshot data mover executing on the host and outside of the virtual machine;
passing the request for the snapshot from the snapshot data mover to a virtual machine manager;
receiving, at the snapshot data mover, an identifier identifying the snapshot from the virtual machine manager; and
passing the snapshot identifier to the data protection agent to allow the data protection agent to locate the snapshot and conduct the backup.

8. The system of claim 7 wherein the indication that archive attributes of all the files should remain unchanged thereby prevents application logs from being truncated.

9. The system of claim 7 wherein the copy service comprises a volume shadow copy service (VSS) and the issuing the first request to the copy service comprises passing a value of "VSS_BT_COPY" to the copy service.

10. The system of claim 7 wherein the issuing a first request to the copy service further comprises:
instructing a first writer associated with a first application running in the virtual machine to prepare and place the first application in a state for backup;
instructing a second writer associated with a second application running in the virtual machine to prepare and place the second application in a state for backup;
checking that the first and second writers have prepared and placed their respective applications in a state for backup; and
if any of the first or second writers have indicated that their respective applications are not in a proper state for backup, prompting a user to restart the respective application.

11. The system of claim 7 wherein the data protection agent is installed as a guest within the virtual machine.

12. The system of claim 7 wherein the data protection agent comprises a requestor and a provider, wherein the requestor is responsible for interfacing with the copy service to make the snapshot request and the provider is responsible for interfacing with the copy service to provide the identifier for the snapshot.

13. A computer program product, comprising a non-transitory computer-readable medium having a computer-readable program code embodied therein, the computer-readable program code adapted to be executed by one or more processors to implement a method comprising:
receiving at a data protection agent a command to conduct a file system-consistent backup of a virtual machine, the virtual machine comprising a plurality of applications and a copy service having a plurality of application writers and a plurality of system writers, the application writers being responsible for quiescing the applications, and the system writers being responsible for quiescing system state of the virtual machine;
issuing, from the data protection agent, a first request to the copy service indicating that all files of the virtual machine are to be backed up and that archive attributes of all the files should remain unchanged, the first request thereby triggering the copy service to notify the application writers and system writers of a snapshot operation;
issuing, from the data protection agent, a second request to a snapshot data mover for a snapshot of the virtual machine, the snapshot data mover executing on the host and outside of the virtual machine;
passing the request for the snapshot from the snapshot data mover to a virtual machine manager;

receiving, at the snapshot data mover, an identifier identifying the snapshot from the virtual machine manager; and passing the snapshot identifier to the data protection agent to allow the data protection agent to locate the snapshot and conduct the backup.

14. The computer program product of claim 13 wherein the indication that archive attributes of all the files should remain unchanged thereby prevents application logs from being truncated.

15. The computer program product of claim 13 wherein the copy service comprises a volume shadow copy service (VSS) and the issuing the first request to the copy service comprises passing a value of "VSS_BT_COPY" to the copy service.

16. The computer program product of claim 13 wherein the issuing a first request to the copy service further comprises:

instructing a first writer associated with a first application running in the virtual machine to prepare and place the first application in a state for backup;

instructing a second writer associated with a second application running in the virtual machine to prepare and place the second application in a state for backup;

checking that the first and second writers have prepared and placed their respective applications in a state for backup; and if any of the first or second writers have indicated that their respective applications are not in a proper state for backup, prompting a user to restart the respective application.

17. The computer program product of claim 13 wherein the data protection agent is installed as a guest within the virtual machine.

18. The computer program product of claim 13 wherein the data protection agent comprises a requestor and a provider, wherein the requestor is responsible for interfacing with the copy service to make the snapshot request and the provider is responsible for interfacing with the copy service to provide the identifier for the snapshot.

* * * * *